US012523812B2

(12) United States Patent
Qin et al.

(10) Patent No.: US 12,523,812 B2
(45) Date of Patent: Jan. 13, 2026

(54) BACKLIGHT MODULE, DISPLAY MODULE AND DISPLAY APPARATUS

(71) Applicants: Beijing BOE Display Technology Co., Ltd., Beijing (CN); BOE TECHNOLOGY GROUP CO., LTD., Beijing (CN)

(72) Inventors: Xuefei Qin, Beijing (CN); Shixin Geng, Beijing (CN); Fuxue Liang, Beijing (CN); Huiyan Li, Beijing (CN); Miao Liu, Beijing (CN); Lulu Wang, Beijing (CN); Yu Zhang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/699,919

(22) PCT Filed: Sep. 14, 2022

(86) PCT No.: PCT/CN2022/118768
§ 371 (c)(1),
(2) Date: Apr. 10, 2024

(87) PCT Pub. No.: WO2024/055206
PCT Pub. Date: Mar. 21, 2024

(65) Prior Publication Data
US 2025/0237806 A1    Jul. 24, 2025

(51) Int. Cl.
*F21V 8/00*    (2006.01)
*G02F 1/1335*    (2006.01)
*G02F 1/13357*    (2006.01)

(52) U.S. Cl.
CPC ......... *G02B 6/0091* (2013.01); *G02B 6/0053* (2013.01); *G02B 6/0055* (2013.01);
(Continued)

(58) Field of Classification Search
CPC ............... G02B 6/0038; G02B 6/0053; G02B 6/0088; G02B 6/0091; G02F 1/133317
See application file for complete search history.

(56) References Cited

U.S. PATENT DOCUMENTS 11,644,615 B2 *  5/2023  Li ................. G02B 6/0091
                                                   362/609
2013/0135901 A1 *  5/2013  Ishimoto ........ G02F 1/133308
                                                   362/617

(Continued)

FOREIGN PATENT DOCUMENTS

CN    204922672 A    12/2015
CN    104819440 B    12/2017
(Continued)

*Primary Examiner* — Keith G. Delahoussaye
(74) *Attorney, Agent, or Firm* — HOUTTEMAN LAW LLC

(57) ABSTRACT

Disclosed are a backlight module, a display module and a display apparatus. The backlight module includes: a back plate including a bottom plate and a plurality of side plates around the bottom plate, where the plurality of side plates and the bottom plate enclose an assembly space; a light guide plate in the assembly space, including a plurality of side faces each disposed opposite to one of the side plates, where a first gap is provided between each side face and the opposite side plate; at least two light bars in different first gaps, where an emission side of each light bar is disposed opposite to the side face of the light guide plate, the first gap with a light bar is a first sub-gap, and a plurality of elastic members, at least part of which are positioned in respective first sub-gaps.

20 Claims, 14 Drawing Sheets

(52) U.S. Cl.
CPC ......... *G02B 6/0085* (2013.01); *G02B 6/0088* (2013.01); *G02B 6/0093* (2013.01); *G02F 1/133615* (2013.01); *G02F 1/133628* (2021.01)

(56) References Cited

U.S. PATENT DOCUMENTS

| | | | |
|---|---|---|---|
| 2013/0308074 A1* | 11/2013 | Park | G02F 1/133308 362/634 |
| 2015/0029442 A1* | 1/2015 | Koike | G02B 5/045 349/65 |
| 2015/0212262 A1* | 7/2015 | Chiang | G02B 6/0093 362/611 |
| 2021/0181580 A1* | 6/2021 | Chen | G02B 6/003 |

FOREIGN PATENT DOCUMENTS

| | | | | |
|---|---|---|---|---|
| CN | 206805071 U | 12/2017 | | |
| CN | 207528956 U | 6/2018 | | |
| CN | 108897166 A | 11/2018 | | |
| CN | 210349098 A | 4/2020 | | |
| CN | 210465912 U | 5/2020 | | |
| CN | 211293331 U | 8/2020 | | |
| CN | 211293534 U | 8/2020 | | |
| CN | 212623471 U | 2/2021 | | |
| CN | 112882289 A | 6/2021 | | |
| CN | 112987403 A | * | 6/2021 | ....... G02F 1/133615 |
| CN | 113281939 A | * | 8/2021 | ........... G02B 6/0068 |
| CN | 213957805 U | 8/2021 | | |
| CN | 214795502 U | 11/2021 | | |
| CN | 111458784 B | 1/2022 | | |
| JP | 2006302565 A | 11/2006 | | |

* cited by examiner

BACKLIGHT MODULE, DISPLAY MODULE AND DISPLAY APPARATUS

TECHNICAL FIELD

The present disclosure relates to the technical field of display devices, and particularly relates to a backlight module, a display module and a display apparatus.

BACKGROUND

With the diversification of application environments of displays, the display is increasingly diversified in the product requirements on form, performance, and parameter, and in the specifications. Currently, there is an increasing demand on display screens at outdoor or large public places, and displays used in such an environment are generally desired to have a high brightness and high resistance to extreme weathers such as high/low temperatures and the like.

To achieve a high brightness design of the display screen, an edge-lit design may be adopted. The single-edge lit design cannot meet a requirement of brightness higher than 1000 nit. To achieve the high brightness design, double-long-edge lit, double-short-edge lit, or single-short-edge plus single-long-edge L-shaped lit is generally adopted. The display screen is typically used in an environment condition of −30° C. to 60° C., and therefore, a sufficient expansion gap should be reserved for the light guide plate when the display screen is to be lit in a high-temperature environment in design considerations.

The light guide plate generally has a rectangular shape. In a backlight structure with a single light bar, the light bar is located on one side of the light guide plate, while position limiting structures for the light guide plate are provided on the other three sides of the light guide plate without the light bar, thereby ensuring that the light guide plate is not movable under different placement conditions. However, dual light bars are desired in displays at outdoor or large public places, and position limiting will be insufficient if provided only on side faces of the light guide plate without the light bar. As a result, when the display is placed upright, inverted, horizontally, vertically or the like, the light guide plate may be significantly moved, and floating fluctuations of the brightness may appear at the same position of the display, which can seriously affect the stable display brightness of the display.

SUMMARY

The present disclosure provides a backlight module, a display module and a display apparatus, which can ensure that the light incidence efficiency of the light source on the light bar will not be significantly changed, thereby ensuring the stable display brightness.

To achieve the above object, the present disclosure adopts the following technical solutions:

A backlight module, includes:
a back plate including a bottom plate and a plurality of side plates around the bottom plate, wherein the plurality of side plates and the bottom plate enclose an assembly space;
a light guide plate in the assembly space, including a plurality of side faces each disposed opposite to one of the side plates, wherein a first gap is provided between each side face and the opposite side plate;
at least two light bars, wherein each of the light bars is provided in different first gaps, wherein an emission side of each light bar is disposed opposite to the side face of the light guide plate, the first gap with a light bar is a first sub-gap, and the first gap without any light bar is a second sub-gap; and
a plurality of elastic members, at least part of which are located in respective first sub-gaps.

Optionally, a length 1 of each elastic member in an extending direction of the first sub-gap where the elastic member is located satisfies:

$$\frac{F_n}{l \times h} = E\left(\frac{\Delta l}{l_0}\right),$$

where $F_n$ is a magnitude of a force applied to the elastic member during compression, E is a tensile strength of the elastic member, $\Delta l$ is a compression amount of the elastic member under the force, $l_0$ is a thickness of the elastic member in a width direction of the first sub-gap where the elastic member is located, and h is a thickness of a contact portion of the elastic member with the light guide plate in a thickness direction of the light guide plate.

Optionally, the plurality of elastic members include first elastic members at two ends of the first sub-gap; and in the first sub-gap, the light bar is located between the two first elastic members.

Optionally, in the first sub-gap, a non-emission side of the light bar is fixedly connected to the side plate, and a second gap is provided between the emission side of the light bar and the side face of the light guide plate.

Optionally, the backlight module further includes a heat dissipation plate in contact with the bottom plate, wherein the heat dissipation plate includes a first heat dissipation part between a non-emission side of the light bar and the side plate;
the non-emission side of the light bar is adhered to the first heat dissipation part, and the emission side of the light bar is abutted against the side face of the light guide plate;
the plurality of elastic members include at least one second elastic member between the first heat dissipation part and the side plate.

Optionally, the heat dissipation plate further includes a second heat dissipation part in contact with the bottom plate; wherein
an avoidance groove opposite to the second heat dissipation part is provided on a side of the bottom plate toward the light guide plate, and the second heat dissipation part is in slidable contact with a bottom of the avoidance groove.

Optionally, a transparent protective structure abutted against the side face of the light guide plate is provided on the emission side of the light bar.

Optionally, the light bar includes a substrate, a plurality of light sources, and a connector, the substrate includes a first portion and a second portion, the first portion is located in the first sub-gap and extends along an extending direction of the first sub-gap, the second portion is located on a side of the first portion in a thickness direction of the light guide plate and extends out of the assembly space through an opening in the back plate, the plurality of light sources are located on a side of the first portion facing the light guide plate, and the connector is located on the second portion.

Optionally, the plurality of elastic members further include third elastic members at two ends of the second sub-gap.

Optionally, each third elastic member is connected to one of the first elastic members at a corner where the first sub-gap is intersected with the second sub-gap.

Optionally, for the third elastic member and the first elastic member intersected with each other, a length of the third elastic member in an extending direction of the first gap where the third elastic member is located is greater than a length of the first elastic member in an extending direction of the first gap where the first elastic member is located.

Optionally, different third elastic members form intersection structures of different shapes with the first elastic members.

Optionally, the plurality of elastic members further include a fourth elastic member in a central region of the second sub-gap.

Optionally, a thickness of each elastic member in a naturally extending state in a width direction of the first gap where the elastic member is located is greater than a width of the first gap; and a sum of widths of two opposite first gaps is greater than an expansion amount of the light guide plate in an arrangement direction of the two opposite first gaps.

Optionally, a distance from a surface of the elastic member away from the bottom plate to a first plane is less than or equal to a distance from a surface of the light guide plate away from the bottom plate to the first plane, wherein the first plane is a plane where a surface of the light guide plate facing the bottom plate is located.

Optionally, each elastic member is made of a rubber material.

Optionally, the backlight module further includes an adhesive member in the central region of the second sub-gap, wherein the side face of the light guide plate is adhered to the side plate by the adhesive member.

Optionally, in the second sub-gap, the adhesive member is in a compressed state under an action of the light guide plate and the side plate.

Optionally, the adhesive member is a double-sided foam tape.

Optionally, the plurality of side faces includes two opposite first side faces and two opposite second side faces, the first sides adjoin the second side faces, and the first side faces each have a length greater than the second side faces; and the at least two light bars include a first light bar and a second light bar respectively positioned in the first gaps between the two first side faces and the corresponding side plates, and a distance from the first light bar to the light guide plate is equal to a distance from the second light bar to the light guide plate.

Optionally, the backlight module further includes a white reflective sheet between the light guide plate and the bottom plate, and an optical film on a side of the light guide plate away from the bottom plate.

Optionally, a reinforcing rib is formed in a region of the bottom plate close to each of the side plates, the reinforcing rib projects toward a side of the bottom plate away from the light guide plate, and a reinforcing rib groove is formed on a side of the reinforcing rib facing the light guide plate; and the backlight module further includes a bottom pad in the reinforcing rib groove, the white reflective sheet is located between the bottom pad and the light guide plate, and the bottom pad is abutted against the white reflective sheet.

Optionally, the bottom pad is integrally formed with the elastic members.

Optionally, a surface of the light guide plate away from the bottom plate has a prism structure.

Optionally, in the prism structure of the surface of the light guide plate away from the bottom plate, an apex angle of the prism has an arc shape.

Optionally, the optical film includes a lower prism film, an upper prism film, and a reflective polarizing brightness-enhancing film, the lower prism film is located on a side of the light guide plate away from the bottom plate, the upper prism film is located on a side of the lower prism film away from the bottom plate, and the reflective polarizing brightness-enhancing film is located on a side of the upper prism film away from the lower prism film; and the prism structure on the light guide plate has a plurality of first prisms arranged side by side and extending in a first direction, the lower prism film has a plurality of second prisms arranged side by side and extending in a second direction, and the upper prism film has a plurality of third prisms arranged side by side and extending in the first direction, wherein the first direction is perpendicular to the second direction.

Optionally, the backlight module further includes a mold frame including a fixing part surrounding the light guide plate, and a window part on a side of the optical film away from the bottom plate, wherein the fixing part is fixedly connected to the side plates, and the window part has a window corresponding to an effective emission region of the light guide plate.

Optionally, a plurality of extension parts are provided on edges of film layers in the optical film, a plurality of positioning parts are provided on the side plates, the fixing part or the elastic members, each positioning part is disposed opposite to one of the extension parts, and the optical film is positioned by the extension parts in cooperation with the corresponding positioning parts on the side plates, the fixing part or the elastic members.

Optionally, on a side of each elastic member away from the bottom plate, a stepped positioning part opposite to the extension part is provided, and the stepped positioning part has at least one stepped surface on which the extension parts of the film layers in the optical film are lapped.

Optionally, the stepped positioning part has one stepped surface flush with a surface of the optical film facing the bottom plate, and the extension parts of the film layers in the optical film are lapped on the stepped surface; or, the stepped positioning part has a plurality of stepped surfaces each parallel and flush with a surface of each film layer in the optical film facing the bottom plate, and the extension parts of the film layers in the optical film are lapped on the respective stepped surfaces.

Optionally, a convex positioning part cooperated with the extension parts is provided on a side of each elastic member away from the bottom plate, the extension parts each have a first insertion hole cooperated with the convex positioning part, and the convex positioning part is cooperated with and inserted into the first insertion hole.

Optionally, each film layer in the optical film includes a first edge and a second edge opposite to each other, the first edge is provided with at least one first extension part having a second insertion hole, and the second edge is provided with at least one second extension part in one-to-one correspondence with the at least one first extension part;

a first positioning part cooperated with the first extension part is provided on a side of the side plates or the fixing part away from the bottom plate, the first positioning part includes a first sink and a boss at a bottom of the first sink, the first extension part is located in the first sink, and the boss is inserted into the second insertion hole; and a second positioning part cooperated with the second extension part is provided on a side of the side plates or the fixing part away from the bottom plate, the second positioning part includes a second sink in which the second extension part is located.

Optionally, a third gap is provided between two side walls of the first extension part arranged in an extending direction of the first edge and a side wall of the first sink;

a fourth gap is provided between two side walls of the second insertion hole arranged along an arrangement direction the first edge and the second edge and a side wall of the boss;

a fifth gap is provided between two side walls of the second extension part arranged in an extending direction of the second edge and a side wall of the second sink, wherein the fifth gap has a width equal to the third gap; and a sixth gap is provided between the second edge and the side plate where the second sink is located.

Optionally, the first edge is provided with two first extension parts, the second edge is provided with two second extension parts, and each of the second extension parts is disposed opposite to one of the first extension parts, wherein the third gap, the fourth gap and the fifth gap formed by one set of opposite first extension part and second extension part with the side plate or the fixing part are smaller than the third gap, the fourth gap and the fifth gap formed by the other set of opposite first extension part and second extension part with the side plate or the fixing part, respectively.

The present disclosure further provides a display module, including the backlight module according to any of the above solutions, and a display panel on an emission side of the backlight module.

The present disclosure further provides a display apparatus, including the display module according to any of the above solutions.

The present disclosure provides a backlight module, a display module and a display apparatus. The backlight module includes a back plate, a light guide plate, at least two light bars, and a plurality of elastic members, wherein a plurality of first gaps are provided between the light guide plate and the back plate to prevent interference of the back plate with the light guide plate. The light bars are placed in different first gaps, the first gap with a light bar is a first sub-gap, and the first gap without any light bar is a second sub-gap. Part of the elastic members are positioned in respective first sub-gaps, that is, an elastic member is positioned in each first gap with the light bar between the light guide plate and the back plate, and the elastic member in the first sub-gap can position limit the light guide plate at a side of the light guide plate with the light bar, so that a distance between the light bar and the side face of the light guide plate can be prevented from being greatly changed, and it is ensured that the light incidence efficiency of the light source on the light bar will not be significantly changed, thereby avoiding floating fluctuations of the brightness at the same position when the display module is used for display and ensuring the stable display brightness.

REFERENCE SIGNS

1—back plate; 11—bottom plate; 12—side plate; 111—avoidance groove; 112—reinforcing rib; 113—reinforcing rib groove; 113—first sink; 114—boss; 115—second sink; 2—light guide plate; 21—side face; 22—prism structure; 3—light bar; 31—substrate; 311—first portion; 312—second portion; 32—light source; 33—connector; 34—transparent protective layer; 4—elastic member; 41—first elastic member; 42—second elastic member; 43—third elastic member; 44—fourth elastic member; 45—bottom pad; 46—stepped positioning part; 461—stepped surface; 47—convex positioning part; 5—heat dissipation plate; 51—first heat dissipation part; 52—second heat dissipation part; 6—adhesive member; 7—white reflective sheet; 8—optical film; 81—lower prism film; 82—upper prism film; 83—reflective polarizing brightness-enhancing film; 84—extension part; 841—first insertion hole; 842—first extension part; 8421—second insertion hole; and 843—second extension part.

DETAIL DESCRIPTION OF EMBODIMENTS

The technical solutions in the embodiments of the present disclosure will be clearly and completely described below with reference to the accompanying drawings in the embodiments of the present disclosure. Obviously, the described embodiments are only part, but not all, of the embodiments of the present disclosure. Based on the embodiments of the present disclosure, all other embodiments obtained by those ordinary skilled in the art without any creative effort fall into the protection scope of the present disclosure.

Currently, dual light bars are desired in backlight modules of displays at outdoor or large public places. To ensure a stable brightness of the display, a position of a light guide plate in the backlight module has to be limited. In the existing art, a position limiting structure is typically provided on a side of the light guide plate without any light bar. Since the light guide plate generally has a rectangular shape, providing position limiting only on the side(s) of the light guide plate without any light bar in the backlight module with two light bars may lead to insufficient position limiting on sides of the light guide plate with the light bars. As a result, when the display is placed upright, inverted, horizontally, vertically or the like, the light guide plate may be significantly moved, and a distance between light guide plate and the light bar may be greatly changed, causing floating fluctuations of the brightness at the same position of the display, which can seriously affect the stable display brightness of the display.

Figure 1:
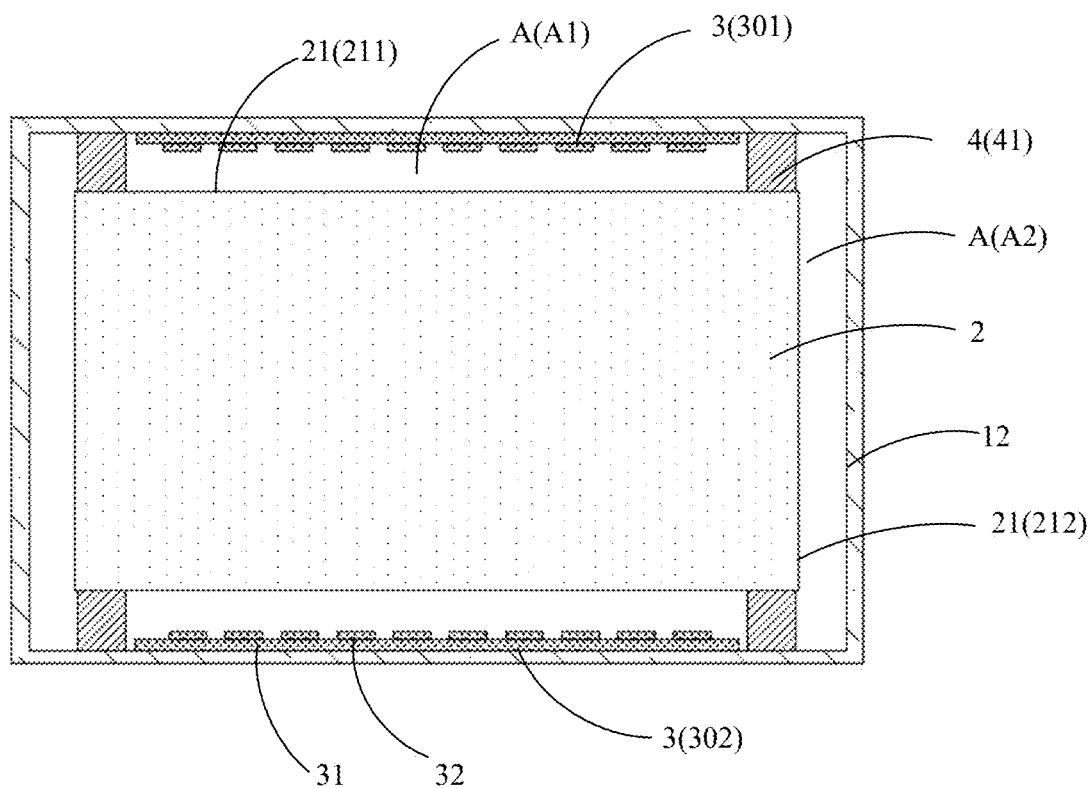
FIG. 1 is a planar structural diagram of a backlight module according to an embodiment of the present disclosure.
Figure 2:
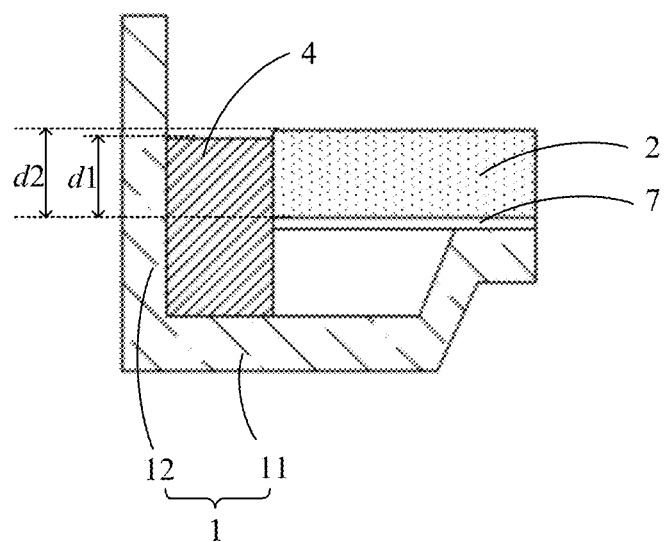
FIG. 2 is a sectional view of a backlight module according to an embodiment of the present disclosure.

To solve the above problem, the present disclosure provides a backlight module which, referring to FIGS. 1 to 2, includes:
- a back plate 1 including a bottom plate 11 and a plurality of side plates 12 around the bottom plate 11, where the plurality of side plates 12 and the bottom plate 11 enclose an assembly space;
- a light guide plate 2 in the assembly space, including a plurality of side faces 21 each opposite to one of the side plates 13, where a first gap A is provided between each side face 21 and the opposite side plate 12;
- at least two light bars 3 in different first sub-gaps A1, where an emission side of each light bar 3 is disposed opposite to the side face 12 of the light guide plate, the first gap A with a light bar 3 is a first sub-gap A1, and the first gap A without any light bar is a second sub-gap A2; and
- a plurality of elastic members 4, at least part of which are positioned in respective first sub-gaps A1.

The backlight module provided in the embodiment of the present disclosure includes a back plate 1, a light guide plate 2, at least two light bars 3, and a plurality of elastic members 4. A plurality of first gaps A are provided between the light guide plate 2 and the back plate 1, so as to prevent interference of the back plate 1 with the light guide plate 2. The light bars 3 are placed in different first gaps A. The first gap A with a light bar 3 is a first sub-gap A1, and the first gap A without any light bar is a second sub-gap A2. Part of the elastic members 4 are positioned in respective first sub-gaps A1. That is, an elastic member 4 is positioned in each first gap with the light bar 3 between the light guide plate 2 and the back plate 1, and the elastic member 4 in the first sub-gap A1 can position limit the light guide plate 2 at a side of the light guide plate with the light bar, so that a distance between the light bar and the side face of the light guide plate can be prevented from being greatly changed, and it is ensured that the light incidence efficiency of the light source on the light bar will not be significantly changed, thereby avoiding floating fluctuations of the brightness at the same position when the display module is used for display and ensuring the stable display brightness.

It should be noted that the backlight module may have a rectangular shape, or have a profiled shape. For example, the backlight module has a hexagonal or octagonal shape. Accordingly, the light guide plate and the side plates of the back plate in the backlight module enclose into a shape matched with the shape of the backlight module. Specifically, the shape of the backlight module is not limited herein, and may be determined according to the actual situation.

In practical applications, as shown in FIG. 1, an emission surface of the light guide plate 2 may have a rectangular shape. The plurality of side faces 21 of the light guide plate 2 may include two opposite first side faces 211 and two opposite second side faces 212. The first side faces 211 adjoin the second side faces 212, and the first side faces 211 each have a length greater than the second side faces 212. The at least two light bars 3 in the backlight module may include a first light bar 301 and a second light bar 302. The first light bar 301 and the second light bar 302 are disposed opposite to the two first side faces 211 of the light guide plate, respectively. That is, double-long-edge lit is adopted at the light guide plate of the backlight module. Comparing with single-edge lit, double-short-edge lit or L-shaped lit, the double-long-edge lit can satisfy the high brightness requirement on the display module. A distance from the first light bar 301 to the light guide plate 2 is equal to a distance from the second light bar 302 to the light guide plate 2, so as to ensure that the light sources on the light bars 301 and 302 on two sides of the light guide plate 2 have a consistent light incidence efficiency.

In the above embodiment of the present disclosure, as shown in FIG. 1, the plurality of elastic members 4 may include first elastic members 41 at two ends of the first sub-gap A1. In the first sub-gap, the light bar 3 is located between the two first elastic members 41, and the light guide plate is position limited by the two elastic members at two ends of the light bar.

A non-emission side of the light bar 3 may be fixedly connected to the side plate 12. A second gap is provided between the emission side of the light bar 3 and the side face 21 of the light guide plate 2, thereby avoiding deformation of the light guide plate due to interference between the light bar and the light guide plate. A width of the second gap may be set according to an expansion amount of the light guide plate 2, which is not limited herein and may be determined according to the actual situation.

In practical applications, an emission surface of the light guide plate 2 in the backlight module may have a rectangular shape, and the light guide plate 2 adopts a double-long-edge lit mode. Taking a backlight module in a 21.5 inch display apparatus as an example, various parameters of the light guide plate 2 may be as shown in table 1.

TABLE 1

| | Length/ Width (mm) | Temperature rise at a high temperature of 85° C. | Expansion coefficient | Expansion amount H/V (mm) | Manufacturing tolerance (mm) | Required expansion space H/V (mm) |
|---|---|---|---|---|---|---|
| LGP | 486.6/275.1 | 60° C. | $1.4 \times 10e^{-5}$ | 0.4/0.25 | 0.3 | 0.7/0.55 |

As can be seen from table 1, the required expansion space of the light guide plate 2 in the width direction is 0.55 mm. In consideration of the tolerances, a width of the gap between each first side face 211 of the light guide plate 2 and the corresponding side plate 12 in the width direction may be set to 0.4 mm. If the light guide plate 2 is not position limited, when the light bar at a single side is placed normally (downward) or inverted (upward), the light guide plate 2 may be moved up and down under the action of gravity, and a gap between the light bar 3 at a single side and the light guide plate 2 may be changed from 0.1 mm under normal placement to 0.9 mm under inversion, causing a reduction of 26% in the single-side light incidence efficiency of the light guide plate 2, and severely affecting single-side brightness stability of the light guide plate (a difference in the single-side brightness of the light guide plate when placed normally and inverted may be up to 28%). The position of the light guide plate 2 can be limited by providing the two first elastic members 4 at two ends of the first sub-gap A1. To improve the brightness stability of double light bars under different use conditions, i.e., normal placement and inversion, a single-side brightness variation of the light guide plate 2 is controlled within 1.5%. Therefore, a sum of lengths of the elastic members in the first sub-gap A1 is adjusted such that the fluctuations of the gap between the emission side of the light bar 3 and the light guide plate 2 are designed to be 0.1 mm to 0.15 mm.

The elastic member 4 is elastically deformed under a force. A length l of the elastic member 4 in an extending direction of the first sub-gap A1 where the elastic member is located satisfies:

$$\frac{F_n}{l \times h} = E\left(\frac{\Delta l}{l_0}\right),$$

where $F_n$ is a magnitude of a force applied to the elastic member during compression; E is a tensile strength of the elastic member, which is a constant; $\Delta l$ is a compression amount of the elastic member under the force; $l_0$ is a thickness of the elastic member in a width direction of the first sub-gap where the elastic member is located; h is a thickness of a contact portion of the elastic member with the light guide plate in a thickness direction of the light guide plate, which is substantially equal to a thickness of the light guide plate; and l×h is a contact area between the elastic member and the light guide plate.

As shown in FIG. 1, if the first sub-gap A1 having the light bar 3 between the light guide plate 2 and the back plate 1 is provided with only the first elastic members 41 at two ends, when the display module is lit vertically (two light bars 3 distributed up and down), the light guide plate 2 sinks downward under the action of gravity to compress and deform the first elastic members 41. Then $\Delta l$ is calculated according to the equation. To ensure that $\Delta l \leq 0.05$ mm, the length of each first elastic member 41 in the first sub-gap A1 can be calculated by the equation. Through calculation with the above data, $\Delta l \leq 0.05$ mm can be satisfied as long as the length of the first elastic member 41 in the first sub-gap A1 is greater than or equal to 3.9 mm.

When the space at two ends of the light bar 3 in the first sub-gap A1 cannot satisfy the length requirement of first elastic member 41, in order to guarantee that $\Delta l$ satisfies the requirement, it is set that: no gap is present between the light bar 3 and the light guide plate 2, and the elastic member 4 may be provided between the light bar 3 and the side plate 12, so that through the elastic member between light bar 3 and the side plate 12, an action area of the elastic member on the light guide plate 2 is increased, a compression amount of the elastic member 4 by the light guide plate 2 can be thus reduced, a movement amplitude of the light guide plate 2 is decrease, and the stable display brightness of the display module is guaranteed.

Figure 3:
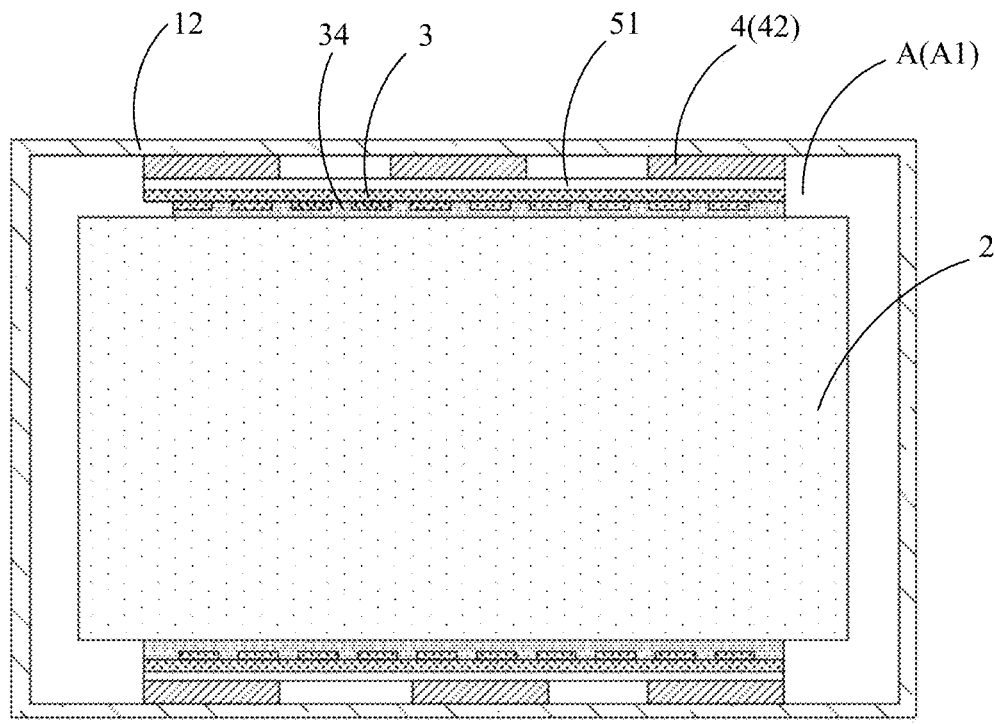
FIG. 3 is a planar structural diagram of another backlight module according to an embodiment of the present disclosure.
Figure 4:
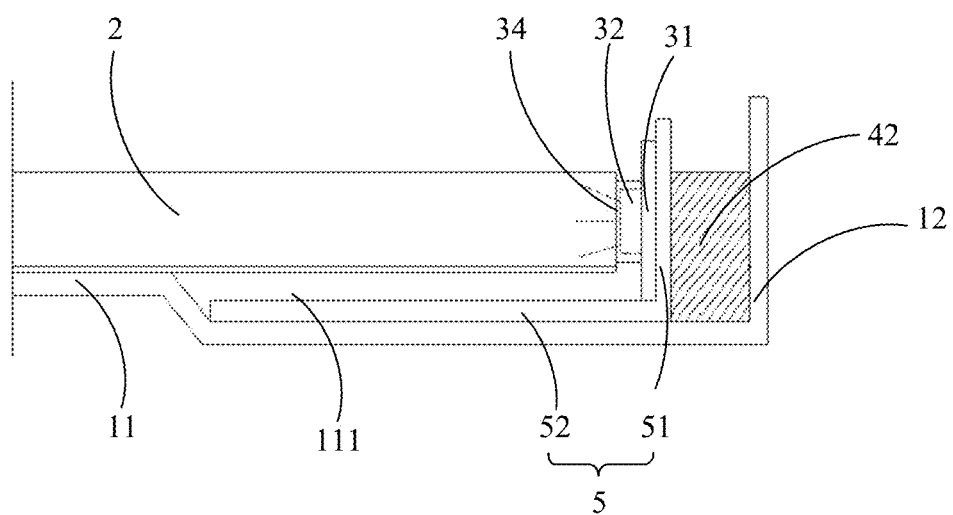
FIG. 4 is a sectional view of another backlight module according to an embodiment of the present disclosure.

Specifically, as shown in FIGS. 3 and 4, the backlight module may further include a heat dissipation plate 5 in contact with the bottom plate 11. The heat dissipation plate 5 includes a first heat dissipation part 51 between a non-emission side of the light bar 3 and the side plate 12. The non-emission side of the light bar 3 is adhered to the first heat dissipation part 51, and the emission side of the light bar 3 is abutted against the side face 21 of the light guide plate 2. The plurality of elastic members 4 include at least one second elastic member 42 between the first heat dissipation part 51 and the side plate 12. In the above structure, the emission side of the light bar 3 is in contact with the light guide plate 2. When the light guide plate 2 is expanded, the light guide plate 2 pushes the light bar 3 to move, and the heat dissipation plate 5 compresses the second elastic member 42 to provide an expansion space for the light guide plate 2 without affecting an emission effect of the light guide plate 2. Moreover, heat generated by the light bar 3 emitting light can be dissipated through the heat dissipation plate 5, thereby avoiding failure of the light bar 3, and the first heat dissipation part 51 of the heat dissipation plate 5 can support the light bar 3, thereby avoiding non-uniform light emission from the light guide plate 2 due to deformation of the light bar 3.

As shown in FIG. 3, a plurality of second elastic members 42 may be provided in the first sub-gap A1, and a plurality of light sources 32 may be provided on the emission side of the light bar 3, and each second elastic member 42 may be disposed at a position corresponding to the light sources 32. Specifically, the number, size and dimension of the second elastic members 42 may be set according to the actual situation, which are not limited herein.

Figure 5:
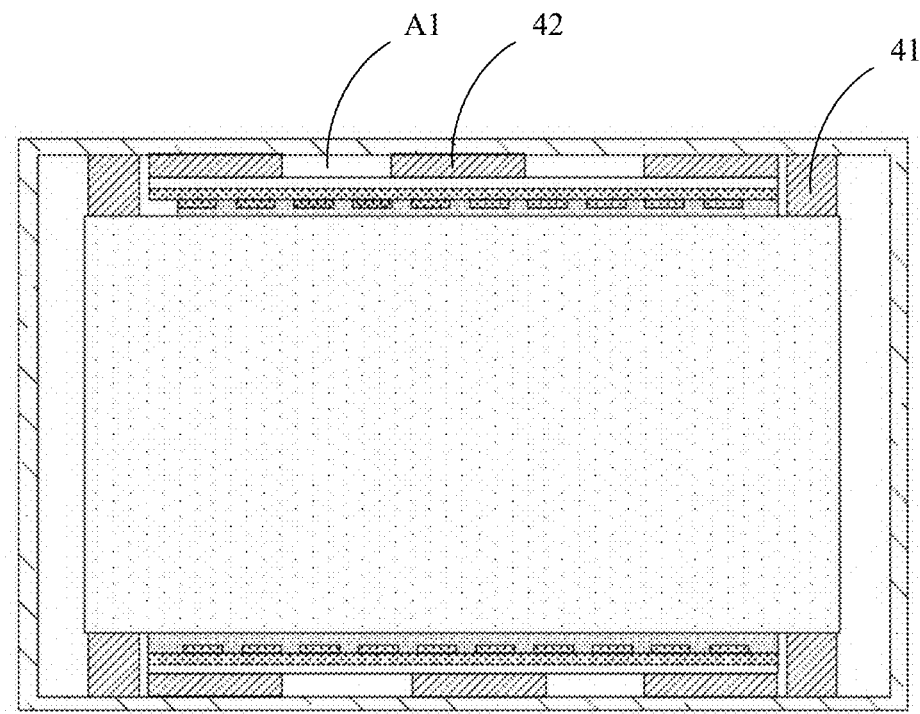
FIG. 5 is a planar structural diagram of another backlight module according to an embodiment of the present disclosure.

It should be noted that the second elastic members 42 may be disposed in the first sub-gap A1 alone, as shown in FIG. 3. Alternatively, the second elastic members 42 may be disposed in the first sub-gap A1 together with the first elastic members 41, as shown in FIG. 5, which is not limited herein and may be determined according to the actual situation.

Specifically, as shown in FIG. 4, the heat dissipation plate 5 further includes a second heat dissipation part 52 in contact with the bottom plate 11. An avoidance groove 111 opposite to the second heat dissipation part 52 is provided on a side of the bottom plate 11 toward the light guide plate 2. The second heat dissipation part 52 is in slidable contact with a bottom of the avoidance groove 111. As such, heat on the heat dissipation plate 5 can be discharged from the bottom plate 11, and a gap can be provided between the second heat dissipation part 52 and the light guide plate 2, so as to prevent interference between the second heat dissipation part 52 and the light guide plate 2 or other film layers in the backlight module. The second heat dissipation part 52 may be a plate-like part perpendicular to the first heat dissipation part 51.

Specifically, the heat dissipation plate 5 may be made of aluminum, which has good heat dissipation performance.

As shown in FIG. 4, a transparent protective structure 34 abutted against the side face 21 of the light guide plate 2 is provided on the emission side of the light bar 3. The transparent protective structure is located between the light source 32 on the light bar 3 and the light guide plate 2, so that the light source 32 on the light bar 3 will not be damaged while the emission side of the light bar contacts the light guide plate 2. Specifically, the transparent protective structure 34 may have a hardness higher than the light source 32 on the light bar 3. A thickness of the transparent protective structure 34 in a width direction of the first gap where the transparent protective structure is located is greater than a thickness of the light source 32 in a width direction of the first gap where the light source is located, so that the transparent protective structure can protect the light source. The thickness of the transparent protective structure 34 may be 0.2 mm, or may be other values, which is not limited herein and may be determined according to the actual situation.

The fixation between the light bar 3 and the back plate 1, or the fixation between the light bar 3 and the heat dissipation plate 5, may be implemented by a thermal conductive adhesive, which enables heat generated by the light bar 3 emitting light to be discharged from the bottom plate 11 rapidly, thereby prolonging the service life of the backlight module.

Figure 6:
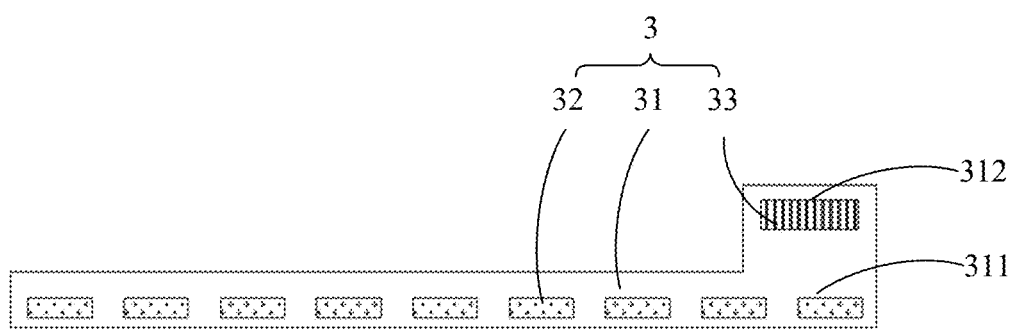
FIG. 6 is a schematic structural diagram of light bars according to an embodiment of the present disclosure.

In addition, when the first elastic member 41 is provided in the first sub-gap A1, the structure of the light bar may be designed to make the spaces at two ends of the light bar in the first sub-gap A1 satisfy the requirement as much as possible. As shown in FIG. 6, the light bar 3 may include a substrate 31, a plurality of light sources 32, and a connector 33. The substrate 31 includes a first portion 311 and a second portion 312. The first portion 311 is located in the first sub-gap A1, and extends along an extending direction of the first sub-gap A1. The second portion 312 is located on a side of the first portion 311 in a thickness direction of the light guide plate 2. The second portion 312 extends out of the assembly space through an opening in the back plate 1. The plurality of light sources 32 are located on a side of the first portion 311 facing the light guide plate 2. The connector 33 is located on the second portion 312.

The light source 32 on the first portion 311 of the substrate 31 may be connected to the connector 33 on the second portion 312 of the substrate 31, and the connector 33 may extend out of the assembly space along with the second portion 312 to be connected to a main control board of the display apparatus, so that an emission state of the light source 32 on the light bar 3 can be controlled through the main control board.

The second portion 312 of the substrate 31 extends out of the assembly space from the opening in the back plate 1, where the opening may be defined in the bottom plate 11 or the side plate 12, which is not limited herein and may be determined according to the actual situation.

The light source 32 may be an LED light source. A side of the light bar 3 provided with the light source 32 is the emission side of the light bar 3, and a side of the light bar 3 facing away from the light source 32 is the non-emission side of the light bar 3. The substrate 31 may be an aluminum substrate.

In the above light bar 3, the first portion 311 and the second portion 312 of the substrate 31 are arranged along a thickness direction of the light guide plate 2, so that a distance between edges of the light source 32 and the substrate 31 along an extending direction of the first sub-gap A1 can be minimized, and a portion (the first portion) of the light bar 3 in the first gap is short enough while ensuring the effective emission region of the light guide plate 2. Therefore, first elastic members 41 of a sufficient length can be provided at two ends of the light bar 3, to increase a contact area between the first elastic members 41 and the light guide plate 2, reduce the compression amount of the first elastic members 41, prevent the position of the light guide plate 2 from being greatly changed along with movement of the backlight module, such as changes in the use direction, and enhance the brightness stability of the display module when used for display.

In the above light bar, a limit of the distance from the light source 32 at an end of the first portion 311 of the substrate 31 to an edge of the substrate 31 may be 0.5 mm, so that a total length of the substrate 31 in an extending direction of the first portion 311 may be 1 mm longer than a total arrangement length of the plurality of light sources 32.

Figure 7:
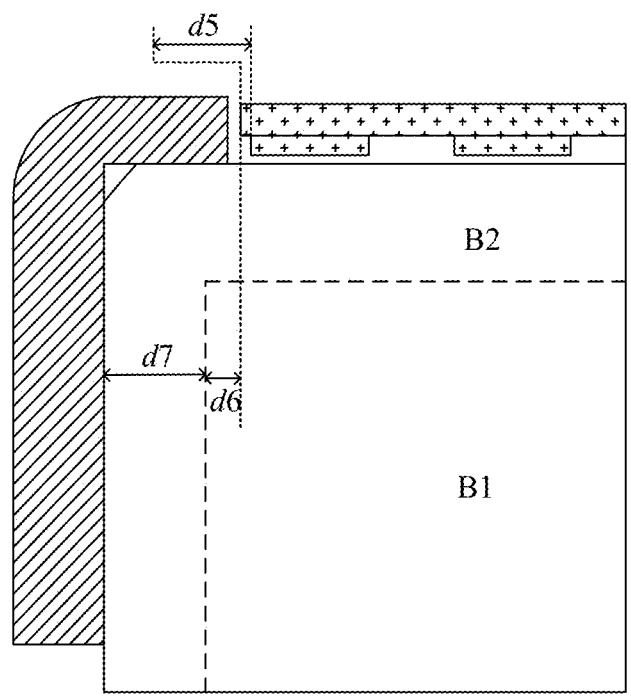
FIG. 7 is a planar structural diagram showing a corner of a backlight module according to an embodiment of the present disclosure.

In practical applications, taking a backlight module in a 21.5 inch display apparatus as an example, as shown in FIG. 7, on the emission side of the light bar 3, a limit d5 of the distance from the light source 32 at the end to the edge of the substrate 31 in the extending direction of the light bar 3 is 0.5 mm, and the light source 32 has an emission angle of 60°. An emission surface of the light guide plate 2 may be divided into an effective emission region B1 and a non-effective emission region B2 surrounding the effective emission region. When an edge of the effective emission region B1 extending along a width direction of the light guide plate 2 falls within the emission surface of the light source 32 at the end of the light bar 3, the display screen will not have display defects such as dark shadows. Therefore, the position of the light source 32 at the end of the light bar 3 corresponds to the effective emission region B1 of the light guide plate 2, and a distance from the light source 32 at the end of the light bar 3 to an edge of the effective emission region B1 extending in the width direction may be set as d6=1.15 mm. According to design requirements, a limit of a distance from an edge of the light guide plate 2 extending in the width direction to the effective emission region B1 may be set as d7=3.7 mm. That is, a distance from the end of the light bar 3 to the edge of the light guide plate 2 extending in the width direction is d6+d7=4.85 mm, which is much longer than the required length of 3.9 mm of the first elastic member 41. In this case, it is not necessary to increase a width of the non-effective emission region B2 of the light guide plate 2 to accommodate the design of the first elastic member 41. In other words, it is not necessary to increase a width of a bezel region of the display module, and the second elastic member 42 can be omitted.

In practical applications, taking a backlight module in a 21.5 inch display apparatus as an example, the light source 32 may be an LED bead with a 4014 package of high luminous efficiency, which adopts 68× 2 lamp beads. The substrate 31 adopts an aluminum substrate with a length of 477.4 mm, a width of 4.8 mm, a thickness of 1.0 mm, and a heat dissipation coefficient of 1 W/m·K. A driving condition of the lamp beads is 76 mA. A single lamp bead has a luminous efficiency of 118.5 lm/W. The light bar 3 may provide a luminous flux of 27lm×68×2ea=3672 lm. The light guide plate adopts double-edge lit. Therefore, the luminance energy required by the display module is ensured.

Figure 8:
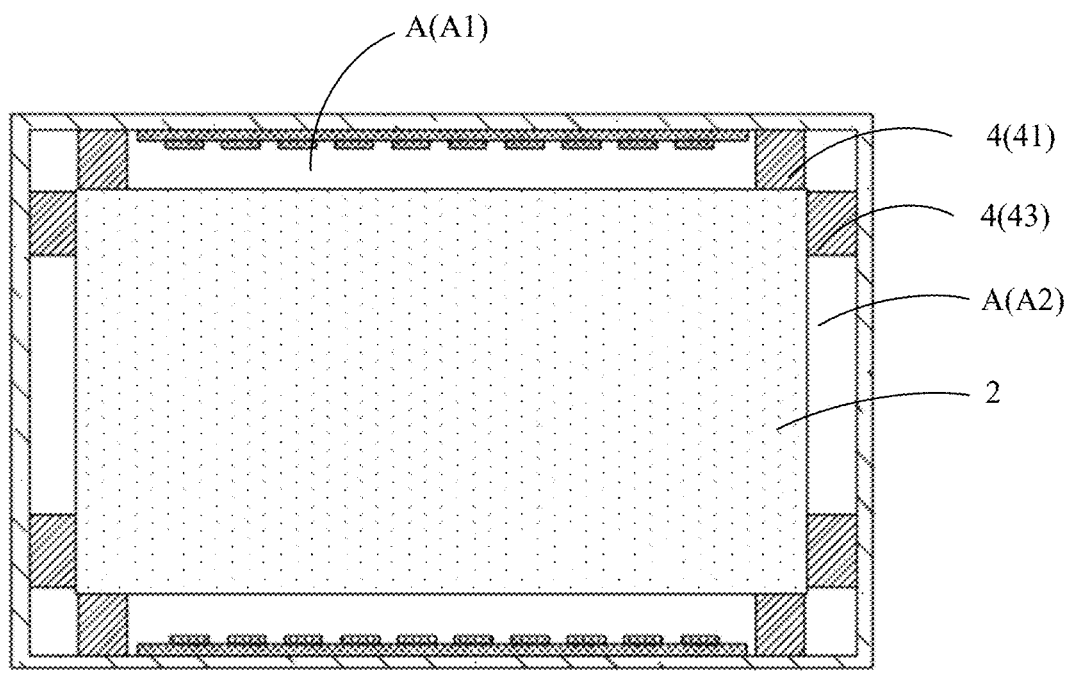
FIG. 8 is a planar structural diagram of another backlight module according to an embodiment of the present disclosure.

In the backlight module provided in the embodiments of the present disclosure, as shown in FIG. 8, the plurality of elastic members 4 further include third elastic members 43 at two ends of the second sub-gap A2. The third elastic members 43 can position limit the light guide plate 2 in the gap without the light bar 3. For example, the first elastic member 41 and/or the second elastic member 42 may position limit the light guide plate in a width direction of the light guide plate, and the third elastic member 43 may position limit the light guide plate in a length direction of the light guide plate.

In the above backlight module, in the assembly process of the light guide plate 2, an assembly space can be provided by compressing the surrounding elastic members 4. When the light guide plate 2 is assembled in place, a sufficient expansion space can be provided by compressing the elastic members 4, while the elastic members 4 adjust the resilience automatically to reach a consistent stress, so that the first gaps A are evenly distributed around the light guide plate and in a stable state. Therefore, the position of the light guide plate 2 will not be greatly changed along with movement of the backlight module, such as changes in the use direction, and it is ensured that the light incidence efficiency of the light source on the light bar will not be significantly changed, thereby avoiding floating fluctuations of the brightness at the same position when the display module is used for display and ensuring the stable display brightness.

Figure 9:
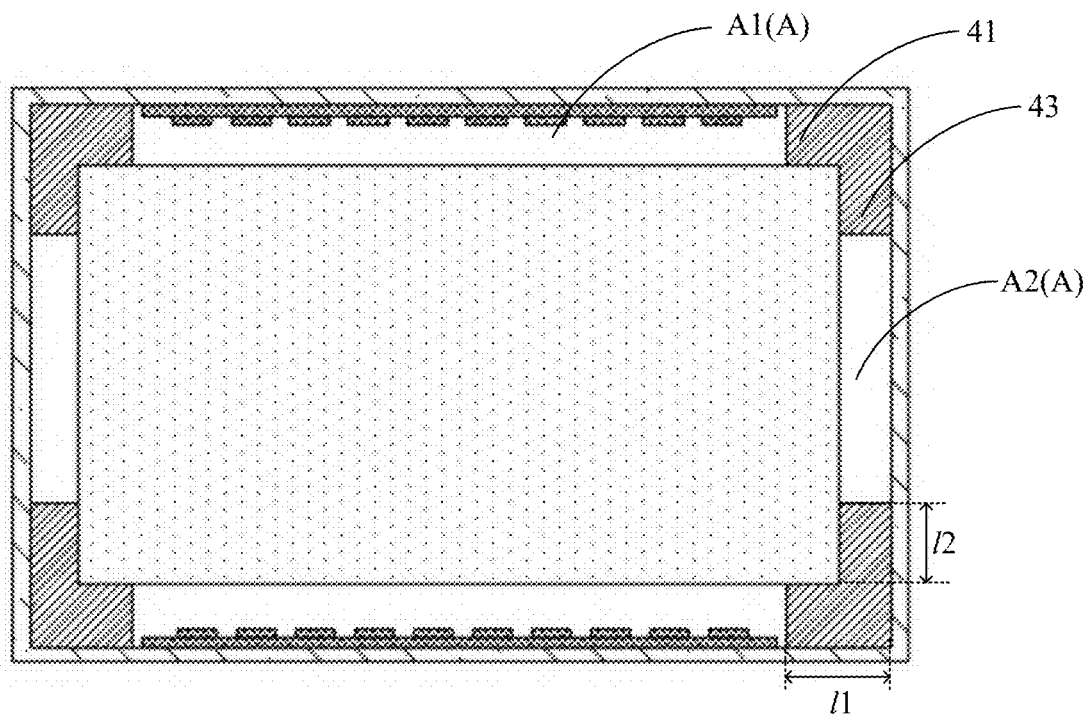
FIG. 9 is a planar structural diagram of another backlight module according to an embodiment of the present disclosure.

As shown in FIG. 9, at a corner where the first sub-gap A1 is intersected with the second sub-gap A2, the third elastic member 43 and the first elastic member 41 may be connected with each other, so that the light guide plate 2 can be better position limited by the elastic members.

Meanwhile, if two intersected first sub-gaps are present in the backlight module, then at a corner where the two first sub-gaps are intersected, two first elastic members at one end may be also connected with each other; and if two intersected second sub-gaps are present in the backlight module, then at a corner where the two second sub-gaps are intersected, two third elastic members at one end may be also connected with each other.

Specifically, as shown in FIG. 9, for the third elastic member 43 and the first elastic member 41 intersected with each other, a length 12 of the third elastic member 43 in an extending direction of the first gap A where the third elastic member is located is greater than a length 11 of the first elastic member 41 in an extending direction of the first gap A where the first elastic member is located. In other words, at a corner where two first gaps A are intersected, two connected elastic members may form an "L" shape, so that the position limiting effect on the light guide plate 2 can be enhanced by increasing the length of the third elastic member 43 in the first gap A without the light bar 3.

Specifically, different third elastic members 43 may form intersection structures of different shapes with the first elastic members 41. In the assembly process of the backlight module, different positions can be distinguished by observing different shapes of the elastic members, thereby implementing foolproof assembly.

Figure 10:
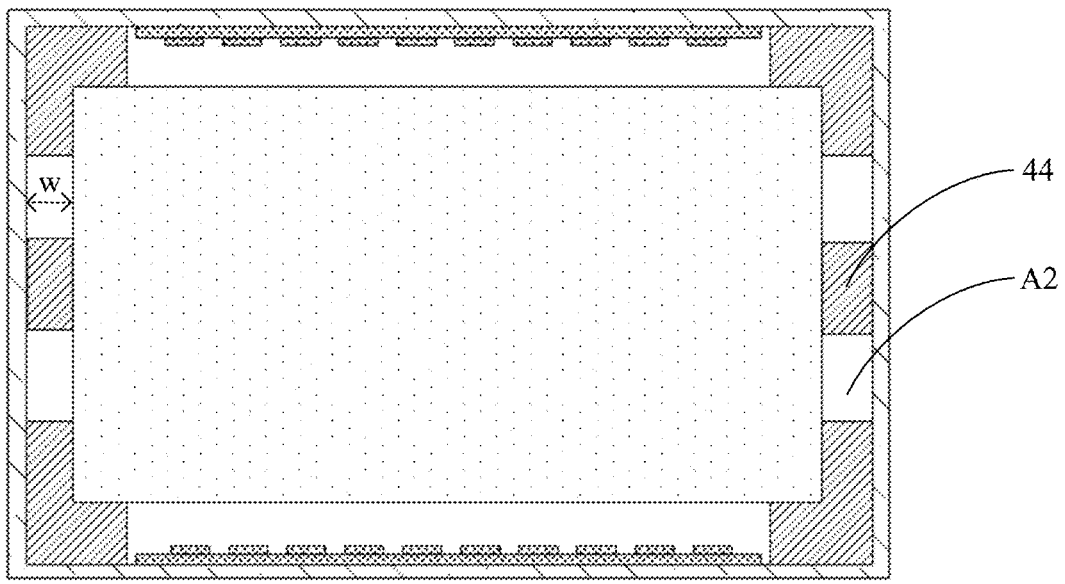
FIG. 10 is a planar structural diagram of another backlight module according to an embodiment of the present disclosure.

In an embodiment of the present disclosure, as shown in FIG. 10, the plurality of elastic members 4 may further include a fourth elastic member 44 in a central region of the second sub-gap A2. By increasing a contact area between the elastic members (the third elastic member 43 and the fourth elastic member 44) in the second sub-gap A2 without the light bar 3 and the light guide plate 2, a compression amount of the elastic members by the light guide plate 2 can be reduced, thereby preventing movement of the light guide plate 2 and enhancing the position limiting effect on the light guide plate 2.

In the embodiments of the present disclosure, the assembly space for the light guide plate is provided by compressing the surrounding elastic members 4, and a thickness of each elastic member in a naturally extending state in a width direction of the first gap where the elastic member is located is greater than a width of the first gap. The design of the thickness of the elastic member 4 in the width direction of the first gap where the elastic member 4 is located is mainly determined by the expansion space required by the light guide plate 2, which specifically satisfies that: in two opposite first gaps, a product of a sum of thicknesses of two opposite elastic members 4 along a width direction of the first gaps where the elastic members are located and a compression ratio of the elastic members 4 per se is greater than a sum of widths w of the two opposite first gaps, which can ensure a sufficient compressible amount of the elastic members 4, where the sum of widths of the two opposite first gaps is greater than an expansion amount of the light guide plate in an arrangement direction of the two opposite first gaps.

For example, in the edge-lit type backlight module shown in FIG. 8, an elastic member 4 is disposed in each first gap. The design of the thickness of the elastic member 4 in the width direction of the first gap where the elastic member 4 is located is mainly determined by the expansion space required by the light guide plate 2, which satisfies that: a product of a sum of thicknesses of two opposite elastic members 4 in a length direction of the light guide plate 2 and a compression ratio of the elastic members 4 is greater than an expansion space of the light guide plate 2 in the length direction, where the expansion space of the light guide plate 2 in the length direction is a sum of widths of two first gaps arranged in the length direction and is greater than an expansion amount of the light guide plate 2 in the length direction; and a product of a sum of thicknesses of two opposite elastic members 4 in a width direction of the light guide plate 2 and a compression ratio of the elastic members 4 is greater than an expansion space of the light guide plate 2 in the width direction, where the expansion space of the light guide plate 2 in the width direction is a sum of widths of two first gaps arranged in the width direction and is greater than an expansion amount of the light guide plate 2 in the width direction. The expansion spaces of the light guide plate 2 in the length direction and in the width direction may be predetermined values that can be determined based on the actual situation, where the expansion amount of the light guide plate 2 is equal to a sum of the following factor: a product of a length or width of the light guide plate 2 and a temperature difference and an expansion coefficient, and a manufacturing tolerance.

In practical applications, taking a backlight module in a 21.5 inch display apparatus as an example, the expansion space required for the light guide plate 2 may be set to 1.0 mm/0.85 mm in the length (H)/width (V) direction. If the compression ratio of the elastic members 4 is 40%, the thickness of each of the two opposite elastic members 4 in the length direction of the light guide plate 2 in the backlight module may be set to 3 mm, while the thickness of each of the two opposite elastic members 4 in the width direction of the light guide plate 2 may be set to 2.3 mm. Therefore, it may be obtained that a compressible space in the backlight module is set to 3×2×0.4=2.4 mm in the length direction, and 2.3×2×0.4=1.84 mm in the width direction, which can satisfy the use condition of the light guide plate 2.

In an embodiment of the present disclosure, as shown in FIG. 2, a distance d1 from a surface of the elastic member 4 away from the bottom plate 11 to a first plane is less than or equal to a distance d2 from a surface of the light guide plate 2 away from the bottom plate 11 to the first plane. The first plane is a plane where a surface of the light guide plate 2 facing the bottom plate 11 is located, and the distance d2 is the thickness of the light guide plate 2. In this manner, interference of the elastic member 4 with other film sheets or structures above the light guide plate 2 is avoided.

Figure 11:
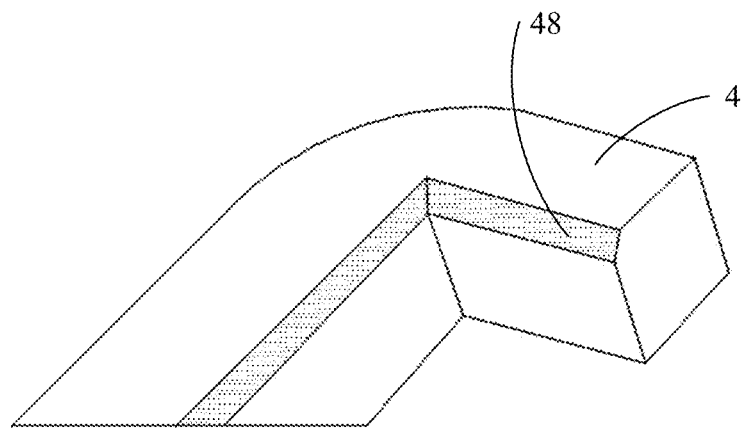
FIG. 11 is a partial structural diagram of an elastic member according to an embodiment of the present disclosure.

In an embodiment of the present disclosure, as shown in FIG. 11, a region adjacent to the light guide plate on a side of the elastic member away from the bottom plate may have a chamfer design. In the assembly process of the light guide plate, a slope of the chamfer 48 on the elastic member 4 can facilitate the light guide plate 2 to be installed into the region enclosed by the elastic member 4. Optionally, the slope of the chamfer 48 may have an inclination angle between 30° and 70°. For example, the slope of the chamfer 48 may have an inclination angle of 45°.

In the embodiments of the present disclosure, the elastic member 4 may be made of a rubber material or other materials, which is not limited herein and may be determined according to the actual situation. For example, the elastic member 4 may be a silicone pad with a shore hardness of 70 degrees and a compression ratio of 40%.

Figure 12:
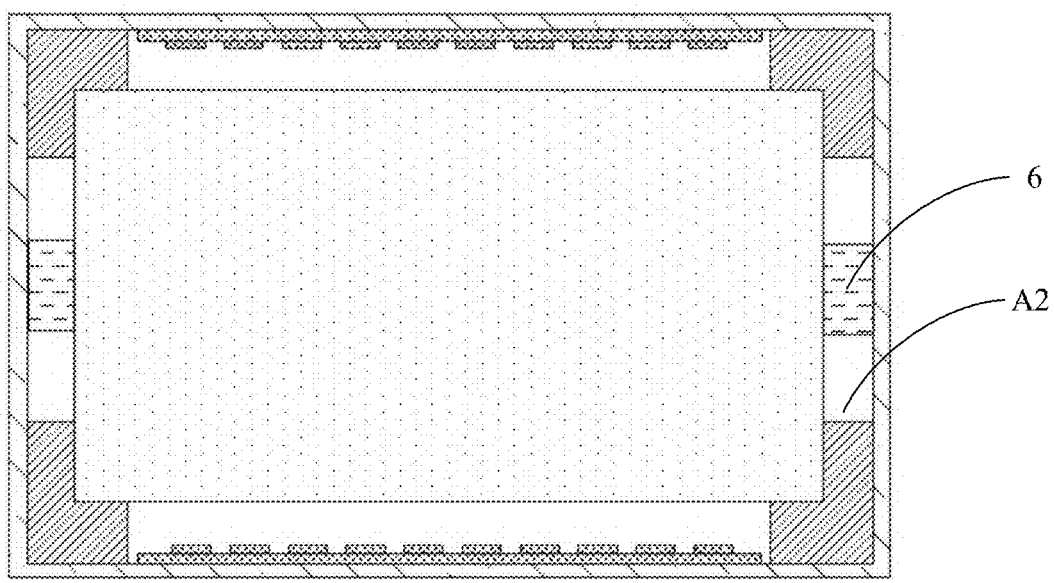
FIG. 12 is a planar structural diagram of another backlight module according to an embodiment of the present disclosure.

In an embodiment of the present disclosure, as shown in FIG. 12, the backlight module may further include an adhesive member 6 in the central region of the second sub-gap A2. The side face 21 of the light guide plate 2 is adhered to the side plate 12 through the adhesive member 6, and the position of the light guide plate 2 in the backlight module can be fixed by the adhesive member 6. When the light guide plate 2 is fixed by the adhesive member 6, the light guide plate 2 is not displaced under an action of gravity when the placement direction of the module is changed, and the relative positions of the light guide plate 2 and the light bar 3 also remain unchanged. Therefore, the emission brightness at the same position the light guide plate 2 remains unchanged, thereby improving the stable display brightness of the display module. On the other hand, when the light guide plate 2 is fixed by the adhesive member 6, the adhesive member 6 is adhered to the back plate 1 and the light guide plate 2, so that an expansion space can be provided for the expanded light guide plate 2 by compressing the adhesive member 6, the adherence will be not impaired due to the length of the light guide plate 2, and the light guide plate 2 is not displaced during transportation or vibrations, thereby obtaining better mechanical reliability.

Specifically, in the second sub-gap, the adhesive member 6 is in a compressed state under an action of the light guide plate 2 and the side plate 12, so that good adherence between the adhesive member 6 and the light guide plate 2 and the back plate 1 is guaranteed through compression, and adhesive failure is avoided. For example, when the light guide plate 2 is initially assembled in the back plate 1, the adhesive member 6 may have a compression amount of 0.2 mm.

Figure 13:
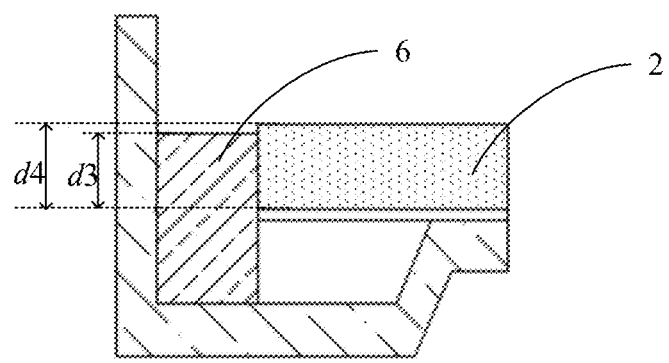
FIG. 13 is a sectional view of another backlight module according to an embodiment of the present disclosure.

In addition, as shown in FIG. 13, a distance d3 from a surface of the adhesive member 6 away from the bottom plate 11 to a first plane is less than or equal to a distance d4 from a surface of the light guide plate 2 away from the bottom plate 11 to the first plane. The first plane is a plane where a surface of the light guide plate 2 facing the bottom plate 11 is located, and the distance d4 is the thickness of the light guide plate 2. In this manner, interference of the adhesive member 6 with other film sheets or structures above the light guide plate 2 is avoided. For example, the adhesive member 6 may have a height 0.2 mm lower than the light guide plate 2.

The adhesive member 6 may be a double-sided foam tape. The double-sided foam tape may have a compression ratio of 50%, so as to provide the expansion space for expansion of the light guide plate 2.

For example, in a backlight module in a 21.5 inch or 27 inch display apparatus, the adhesive member 6 may be designed to have a length of 100 mm and a thickness in the width direction of the second sub-gap of 3.2 mm, and the adhesive member 6 may have a compression ratio of 50%, so as to provide the expansion space for expansion of the light guide plate 2.

Figure 14:
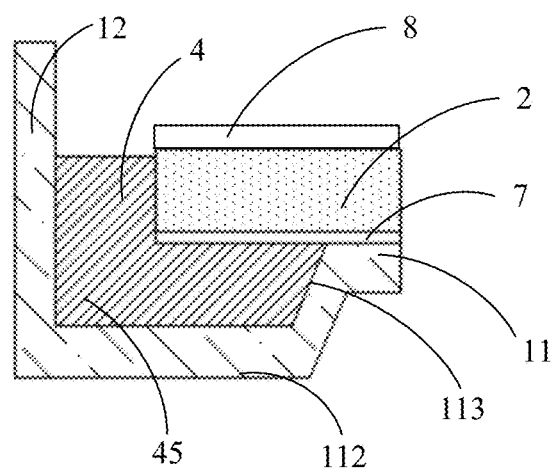
FIG. 14 is a sectional view of another backlight module according to an embodiment of the present disclosure.

In an embodiment of the present disclosure, as shown in FIG. 14, the backlight module may further include a white reflective sheet 7 between the light guide plate 2 and the bottom plate 11, so that light emitted from a side of the light guide plate 2 facing the bottom plate 11 can be reflected back to the light guide plate 2. The white reflective sheet 7 should avoid the elastic member 4 and the adhesive member 6 when installed, so as to avoid interference between the white reflective sheet 7 and the elastic member 4 or the adhesive member 6. As shown in FIG. 13, the backlight module may further include an optical film 8 on a side of the light guide plate 2 away from the bottom plate 11, and configured to improve the emission effect of the backlight module.

Specifically, as shown in FIG. 14, a reinforcing rib 112 is formed in a region of the bottom plate 11 close to the side plate 12. The reinforcing rib 112 projects toward a side of the bottom plate 11 away from the light guide plate 2, and a reinforcing rib groove 113 is formed on a side of the reinforcing rib 112 facing the light guide plate 2. To prevent the white reflective sheet 7 from being trapped into the reinforcing rib groove 113, the backlight module further includes a bottom pad 45 in the reinforcing rib groove 113. The white reflective sheet 7 is located between the bottom pad 45 and the light guide plate 2. The bottom pad 45 is abutted against the white reflective sheet 7. The bottom pad 45 can support and fix the position of the white reflective sheet 7.

Figure 15:
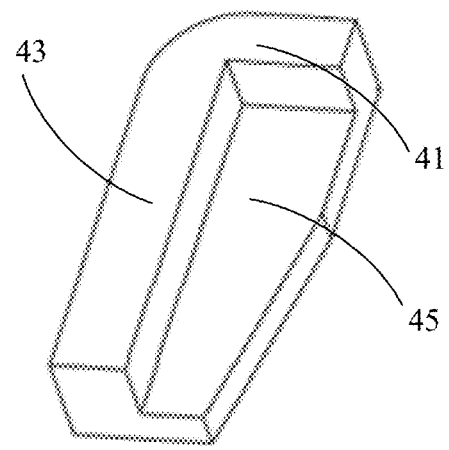
FIG. 15 is a schematic structural diagram showing an elastic member integrally formed with a bottom pad according to an embodiment of the present disclosure.

Specifically, the bottom pad 45 may be integrally formed with the elastic member 4. For example, the bottom pad 45 may be provided at a corner of the back plate 1, and the bottom pad 45 may be made of the same material as the elastic member, and the bottom pad 45 may be integrally formed with the first elastic member 41 and the third elastic member 43 in the first gaps, as shown in FIG. 15, thereby enhancing the mechanical strength of the backlight module.

Figure 16A:
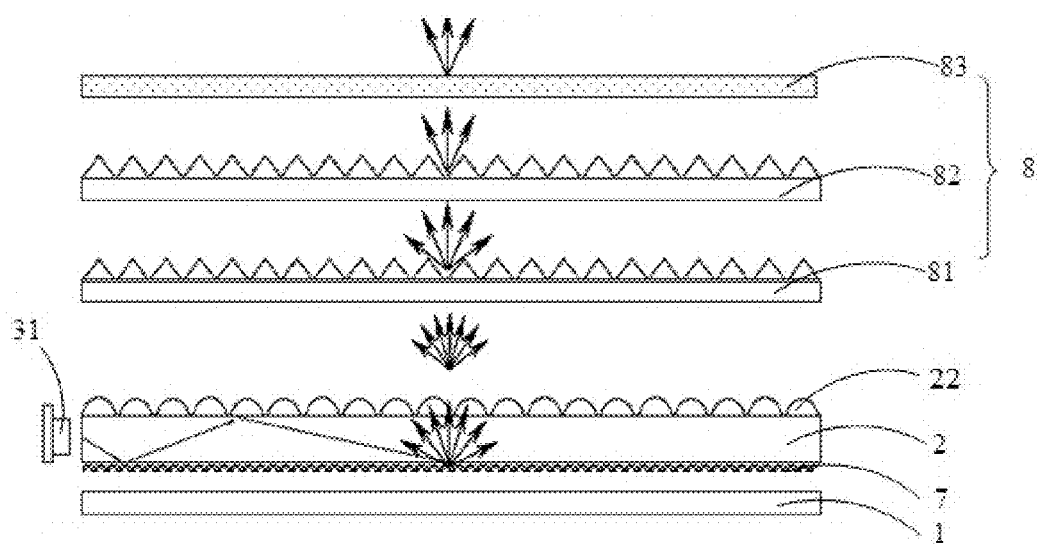
FIG. 16A is an exploded schematic diagram showing light paths in a backlight module according to an embodiment of the present disclosure.

In the above embodiment of the present disclosure, as shown in FIG. 16A, a surface of the light guide plate 2 away from the bottom plate 11 has a prism structure 22, so that stray light incident on the light guide plate 2 from the light source 32 can be gathered, the emission angle can be narrowed, and the emission efficiency of the light guide plate 2 can be improved.

Specifically, as shown in FIG. 16A, in the prism structure 22 of the surface of the light guide plate 2 away from the bottom plate 11, an apex angle of the prism has an arc shape, which can increase the scratch resistance of the light guide plate 2, and provide mechanical stability of the backlight module.

Figure 16B:
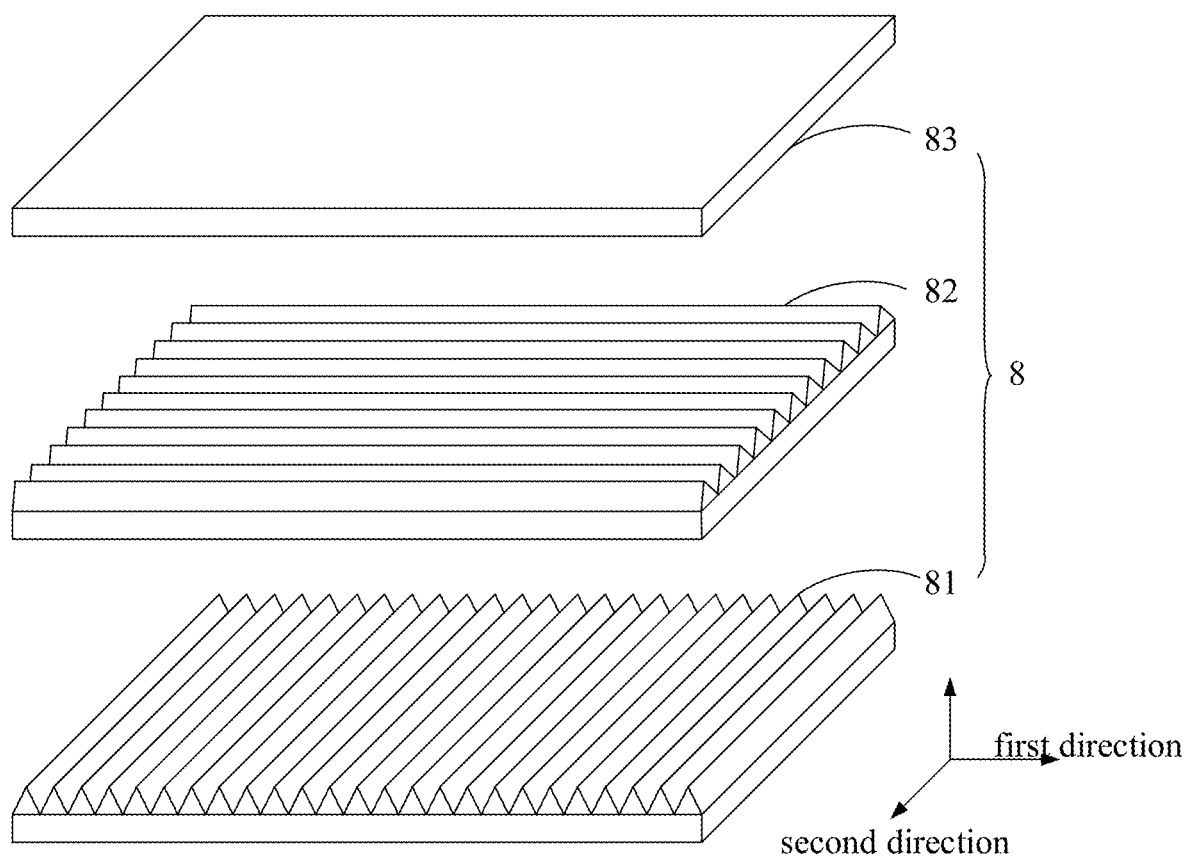
FIG. 16B is a schematic diagram of an optical film according to an embodiment of the present disclosure.

Specifically, as shown in FIGS. 16A and 16B, the optical film 8 includes a lower prism film 81, an upper prism film 82, and a reflective polarizing brightness-enhancing film 83. The lower prism film 81 is located on a side of the light guide plate 2 away from the bottom plate 11. The upper prism film 82 is located on a side of the lower prism film 81 away from the bottom plate 11. The reflective polarizing brightness-enhancing film 83 is located on a side of the upper prism film 82 away from the lower prism film 81. The prism structure 22 on the light guide plate 2 has a plurality of first prisms arranged side by side and extending in a first direction. The lower prism film 81 has a plurality of second prisms arranged side by side and extending in a second direction. The upper prism film 82 has a plurality of third prisms arranged side by side and extending in the first direction. The first direction is perpendicular to the second direction. The first direction may be any direction as long as the first direction is perpendicular to the second direction. In practical applications, for convenience of manufacturing, when the emission surface of the light guide plate has a rectangular shape, the first direction may be a length direction of the light guide plate 2, and the second direction may be a width direction of the light guide plate. In the above embodiment of the present disclosure, FIG. 16A is an exploded schematic diagram showing light paths in a backlight module according to an embodiment of the present disclosure. It should be noted that FIG. 16A is drawn to illustrate the relationship between the light and the first prism, second prism, and third prism, and thus does not reflect the actual extending direction of the aforementioned prisms. In other words, FIG. 16A is for illustrative purposes only and shall not be construed as a limitation on the extending direction of the prisms.

Assuming that an extending direction of the first prisms in the prism structure 22 of the light guide plate 2 is set to 0° horizontally, then an extending direction of the second prisms in the lower prism film 81 is 90°, and an extending direction of the third prisms in the upper prism film 82 is 0°. Therefore, light emitted from the light guide plate 2 passes through the intersected prisms to further gather the stray light in the horizontal direction and the vertical direction, thereby improving the emission efficiency of the module in a direction perpendicular to the emission surface of the light guide plate 2.

The reflective polarizing brightness-enhancing film 83 can recycle the light emitted from the upper prism film 82, thereby greatly improving the brightness of the backlight module.

Figure 17:
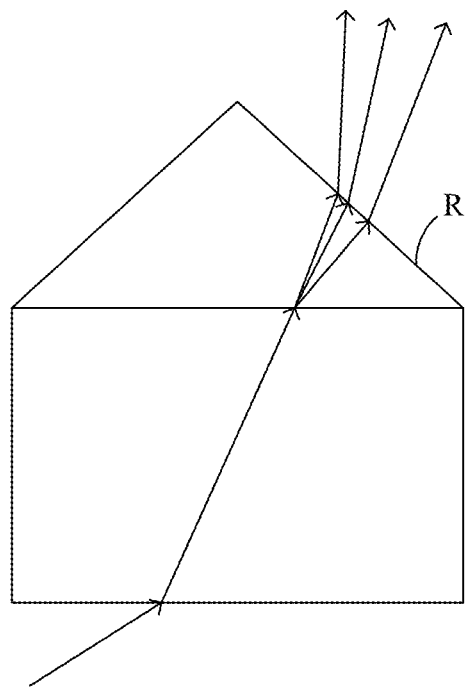
FIG. 17 is a schematic diagram showing light paths in a prism according to an embodiment of the present disclosure.

In practical applications, as shown in FIG. 17, inclined surface R of each prism on each of the prism structure 22 of the light guide plate 2, the lower prism film 81 and the upper prism film 82 form emission surfaces. Light enters from a light incident surface of the prism to be refracted for a first time, and then exits from the inclined surface of the prism to be refracted for a second time. By changing an angle between the light and the vertical plane through the inclined surface of the prisms, an angle of the exiting light is decreased and narrowed toward a center. According to the law of energy conservation, the luminous flux in a large viewing angle is decreased, while the luminous flux within the display viewing angle range is increased, so that the effect of improving the brightness of the image is achieved. Since the narrowing occurs on the inclined surface of the prism, the light gathering direction is related to an extending direction of the prism. That is, the brightness improvement is related to the angle of the prism. For example, if a 0° horizontal prism is used to gather exiting light in a vertical direction of the backlight module, and a 90° vertical prism is used to gather exiting light in a lateral direction the backlight module, the mutually perpendicular directions may be combined to obtain light at any angle according to different intensities. Therefore, two prism films with prisms extending in mutually perpendicular directions can gather the exiting light from a front side of the backlight module, that is, obtain the optimal improvement in the luminous efficiency. Comparing with a film without the prism, the upper and lower prisms each have an intensifying efficiency of 1.25 times in actual tests, while the reflective polarizing brightness-enhancing film 83 has an intensifying efficiency of 1.4 times. Through integrative calculation, the optical film 8 can improve the luminous efficiency of the display module by about 2.2 times.

In an embodiment of the present disclosure, the backlight module may further include a mold frame. The mold frame includes a fixing part surrounding the light guide plate, and a window part on a side of the optical film away from the bottom plate. The fixing part is fixedly connected to the side plates, and the window part has a window corresponding to an effective emission region of the light guide plate.

In an embodiment of the present disclosure, the optical film 8 needs to be position limited to avoid movement. Specifically, a plurality of extension parts are provided on edges of film layers in the optical film 8. A plurality of positioning parts are provided on the side plates of the back plate, or the fixing part of the mold frame, or the elastic members. Each positioning part is disposed opposite to one of the extension parts. The optical film can be positioned by the extension parts in cooperation with the corresponding positioning parts on the side plates, the fixing part or the elastic members. The optical film may include a plurality of layers. For example, the optical film may include the lower prism film 81, the upper prism film 82, the reflective polarizing brightness-enhancing film 83, and the like.

Figure 18:
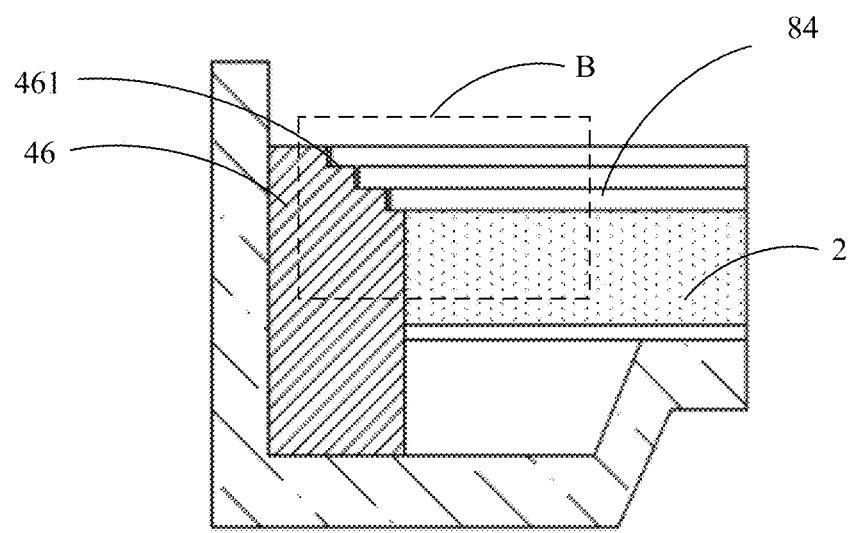
FIG. 18 is a sectional view of another backlight module according to an embodiment of the present disclosure.

In an implementation, as shown in FIG. 18, on a side of each elastic member 4 away from the bottom plate, a stepped positioning part 46 opposite to the extension parts 84 may be provided. The stepped positioning part 46 has at least one stepped surface 461. The extension parts 84 of the film layers in the optical film 8 are lapped on the stepped surface 461. Each film layer in the optical film 8 can be position limited by the stepped positioning part 46 toward a side wall of the optical film 8.

Figure 19:
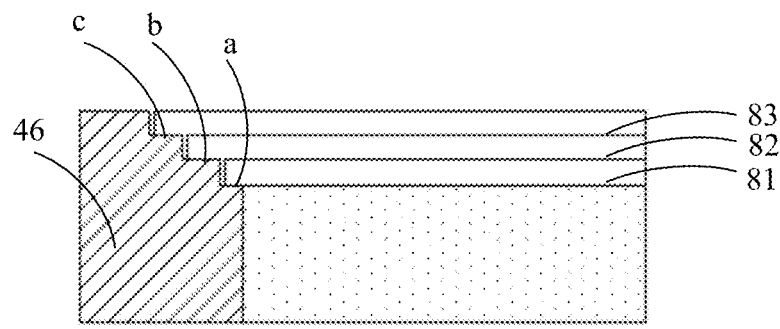
FIG. 19 is an enlarged view of a region B in FIG. 18.

Specifically, the stepped positioning part 46 may have a plurality of stepped surfaces 461. For example, as shown in FIG. 19, the stepped positioning part 46 may include a first stepped surface a, a second stepped surface b, and a third stepped surface c, which correspond to the lower prism film 81, the upper prism film 82, and the reflective polarizing brightness-enhancing film 83 in the optical film 8, respectively. The extension part of the lower prism film 81 is correspondingly lapped on the first stepped surface a. The extension part of the upper prism film 82 is correspondingly lapped on the second stepped surface b. The extension part of the reflective polarizing brightness-enhancing film 83 is correspondingly lapped on the third stepped surface c.

Alternatively, the stepped positioning part 46 may have one stepped surface 461 flush with a surface of the optical film 8 facing the bottom plate, and the extension parts 84 of the film layers in the optical film 8 are lapped on the stepped surface 461. A gap is formed between the extension part 84 of each film layer in the optical film 8 and the side wall of the stepped positioning part 46 facing the optical film 8. An expansion space is provided for the expansion of the optical film through the gap.

Figure 20:
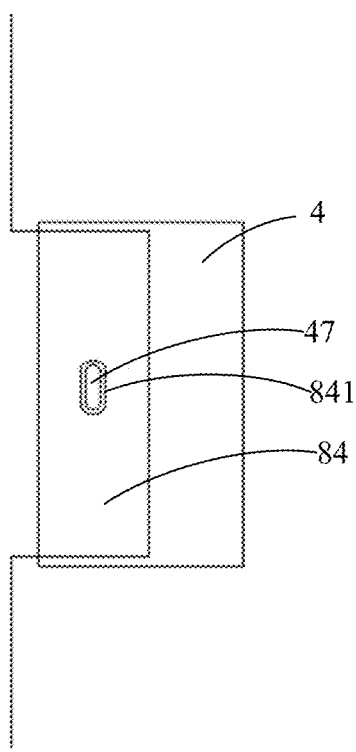
FIG. 20 is a schematic plan view of a positioning part according to an embodiment of the present disclosure.

In an implementation, as shown in FIG. 20, a convex positioning part 47 cooperated with the extension parts 84 may be provided on a side may of each elastic member 4 away from the bottom plate. The extension parts 84 each have a first insertion hole 841 cooperated with the convex positioning part 47. The convex positioning part 47 is cooperated with and inserted into the first insertion hole 841. Specifically, a gap may be provided between a side wall of the convex positioning part 47 and a side wall of the first insertion hole 841. An expansion space is provided for the expansion of the optical film through the gap.

Specifically, each film layer in the optical film 8 may have a first edge and a second edge opposite to each other. The first edge and the second edge may be provided with the extension parts 84, the number of which can be determined according to the actual situation and is not limited herein. Stepped positioning parts 46 may be provided on an elastic member 4 opposite to the first edge and an elastic member 4 opposite to the second edge, so that each film layer in the optical film 8 can be position limited by the stepped positioning parts 46 in the arrangement direction the first edge and the second edge, thereby avoiding movement of the optical film 8. Alternatively, convex positioning parts 47 may be provided on an elastic member 4 opposite to the first edge and an elastic member 4 opposite to the second edge, so that each film layer in the optical film 8 can be position limited by the convex positioning parts 47, thereby avoiding movement of the optical film 8. Alternatively, the stepped positioning part 46 may be provided on the elastic member 4 opposite to the first edge, the convex positioning part 47 may be provided on the elastic member 4 opposite to the second edge, and the stepped positioning part 46 and the convex-shaped positioning part 47 cooperate to position limit each film layer in the optical film 8. Alternatively, the convex positioning part 47 may be provided on the stepped surface 461 of the stepped positioning part 46, and the extension part 84 of each film layer in the optical film 8 is cooperated with the convex positioning part 47 on the stepped surface 461 while being lapped on the stepped surface 461.

The film layer in the optical film 8 has a shape matched with the light guide plate 2. If the optical film 8 has a rectangular shape, the first edge and the second edge may be two opposite shorter sides or two opposite longer sides of the film layer in the optical film 8, which is not limited herein. For example, if extension parts 84 are provided on the two opposite shorter sides of the optical film 8, third elastic members 43 and/or fourth elastic members 44 opposite to each other in the length direction of the light guide plate 2 may have the above positioning parts for position limiting the optical film 8. Alternatively, if extension parts 84 are provided on the two opposite longer sides of the optical film 8, two first elastic members 41 opposite each other in the width direction of the light guide plate 2 may have the above positioning parts for position limiting the optical film 8. Alternatively, if extension parts 84 are provided on both the two opposite shorter sides and the two opposite longer sides of the optical film 8, the positioning parts may be provided on the third elastic members 43, the fourth elastic members 44 and the first elastic members 41.

Figure 21:
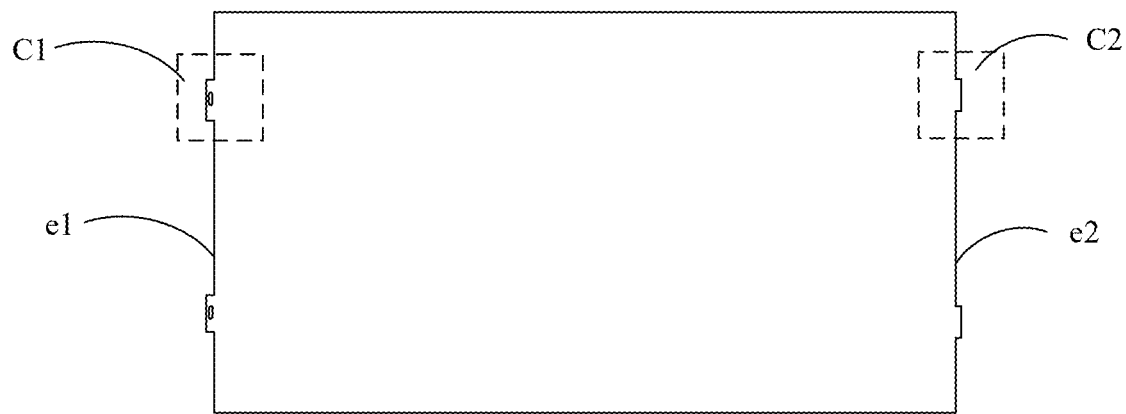
FIG. 21 is a schematic plan view of an optical film according to an embodiment of the present disclosure.
Figure 22:
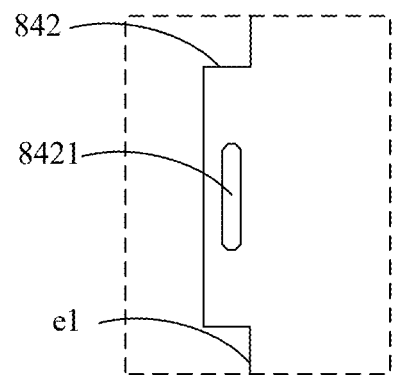
FIG. 22 is an enlarged view of a region C1 in FIG. 21.
Figure 23:
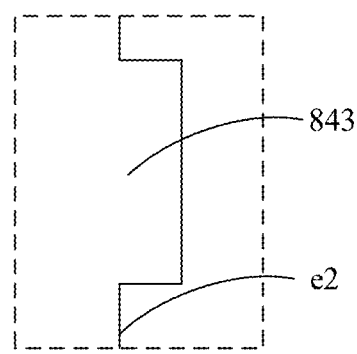
FIG. 23 is an enlarged view of a region C2 in FIG. 22.
Figure 24:
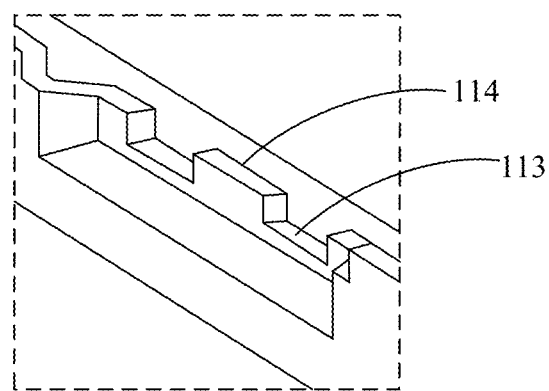
FIG. 24 is a schematic structural diagram of a first sink according to an embodiment of the present disclosure.
Figure 25:
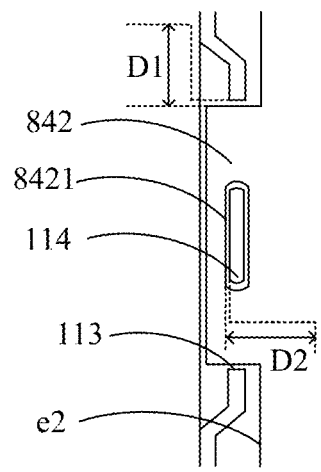
FIG. 25 is a schematic structural diagram showing a first extension part cooperated with a first sink according to an embodiment of the present disclosure.
Figure 26:
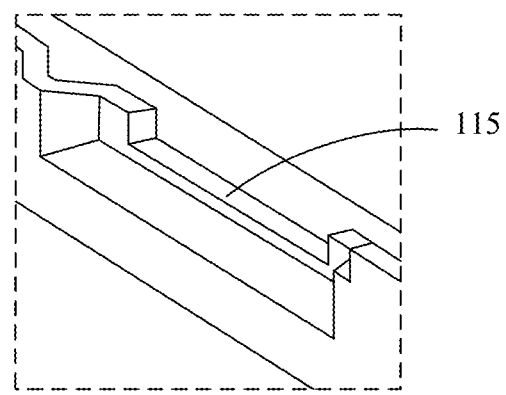
FIG. 26 is a schematic structural diagram of a second sink according to an embodiment of the present disclosure.
Figure 27:
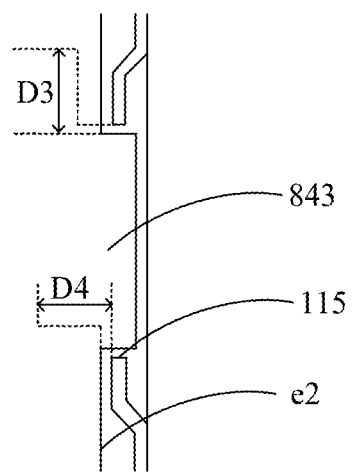
FIG. 27 is a schematic structural diagram showing a second extension part cooperated with a second sink according to an embodiment of the present disclosure.

In an embodiment of the present disclosure, as shown in FIGS. 21 and 22, each film layer in the optical film 8 may have a first edge e1 and a second edge e2 opposite to each other. The first edge e1 may have at least one first extension part 842 having a second insertion hole 8421. As shown in FIG. 23, the second edge e2 of each film layer in the optical film 8 is provided with at least one second extension part 843. The second extension part is in one-to-one correspondence with the at least one first extension part. Meanwhile, as shown in FIGS. 24 and 25, a first positioning part cooperated with the first extension part 842 is provided on a side of the side plate 12 away from the bottom plate 11. The first positioning part includes a first sink 113 and a boss 114 at a bottom of the first sink 113. The first extension part 84 is located in the first sink 113, and the boss 114 is inserted into the second insertion hole 8421. Meanwhile, as shown in FIGS. 26 and 27, a second positioning part cooperated with the second extension part 843 is provided on a side of the side plate 12 away from the bottom plate 11. The second positioning part includes a second sink 115 in which the second extension part 843 is located. Optionally, the first sink, the boss and the second sink may be disposed on the fixing part of the mold frame, which is not limited herein and may be determined according to the actual situation.

In the above backlight module, the first extension part 842 is cooperated with the first sink 113, and the second extension part 843 is cooperated with the second sink 115, to position limit the optical film 8 in the extending direction of the first edge e1 and the second edge e2. The second insertion hole 8421 is cooperated with the boss 114 to position limit the optical film 8 in the arrangement direction the first edge e1 and the second edge e2. The first extension part 842 is cooperated with the first positioning part, and the second extension part 843 is cooperated with the second positioning part, to position limit the optical film 8 in two directions simultaneously.

Specifically, due to an assembly error, a manufacturing error, and the required expansion space of the optical film, a third gap D1 may be provided between two side walls of the first extension part 842 arranged in an extending direction of the first edge e1 and a side wall of the first sink 113, a fourth gap D2 may be provided between two side walls of the second insertion hole 8421 arranged along an arrangement direction the first edge e1 and the second edge e2 and a side wall of the boss 114, a fifth gap D3 may be provided between two side walls of the second extension part 843 arranged in an extending direction of the second edge e2 and a side wall of the second sink 115. The fifth gap D3 has a width equal to the third gap D1, and a sixth gap D4 is provided between the second edge e2 and the side plate 12 where the second sink 115 is located.

Specifically, the first edge e1 may have two first extension parts 842, and the second edge may have two second extension parts 843. Each of the second extension parts 843 is disposed opposite to one of the first extension parts 842. The third gap, the fourth gap and the fifth gap formed by one set of opposite first extension part and second extension part with the side plate or the fixing part are smaller than the third gap, the fourth gap and the fifth gap formed by the other set of opposite first extension part and second extension part with the side plate or the fixing part, respectively, thereby achieving a combination of fine positioning and rough positioning.

In practical applications, as shown in FIGS. 21 to 27, the first edge e1 of the optical film 8 extending along the width direction of the light guide plate 2 has two first extension parts 842 arranged up and down in the width direction, and the second edge e2 has two second extension parts 843 arranged up and down in the width direction. An upper set of first extension part 842 and second extension part 843 opposite to each other can implement fine positioning, while a lower set of first extension part 842 and second extension part 843 can implement rough positioning. The expansion process of the optical film is a process of expanding outward from a fine positioning position. By providing the rough positioning portion, a sufficient expansion gap can be provided in the expansion process of the optical film, thereby ensuring flatness of the optical film.

Taking a backlight module in a 21.5 inch display apparatus as an example, dimension data of the prism film and the brightness-enhancing film in the optical film is shown in table 2.

TABLE 2

| | Length/Width (mm) | Temperature rise at a high temperature of 85° C. | Expansion coefficient | Expansion amount H/V (mm) | Manufacturing tolerance (mm) | Required expansion space H/V (mm) |
|---|---|---|---|---|---|---|
| Brightness-enhancing film | 486.5/269 | 60° C. | $4.2 \times 10e^{-5}$ | 1.23/0.7 | 0.3 | 1.53/1.0 |
| Prism film | 486.5/269 | 60° C. | $2.7 \times 10e^{-5}$ | 0.8/0.43 | 0.3 | 1.1/0.73 |

According to the above data and as shown in FIGS. 21, 25, and 27, a manufacturing tolerance of the second insertion hole 8421 is +0.1 mm, a wall thickness tolerance of the boss 114 is +0.05 mm. In consideration of the tolerances, a width of the second insertion hole 8421 is designed to be 0.15 mm larger than a single side wall thickness of the boss 114, that is, the fourth gap D2=0.15 mm. Therefore, the wall thickness of the boss 114 may be set to 1.5 mm, and the width of the second insertion hole 8421 may be designed to 1.8 mm. Through the cooperation of the second insertion hole 8421 and the boss 114, the movement of the optical film along a longer side direction of the light guide plate is limited. Since the optical film extends toward the right from the left first extension part 842 when expanding, a sufficient expansion gap, i.e., the sixth gap D4, should be calculated and reserved between the right side of the optical film and the side plate 12 according to the expansion condition. Based on the above table 2, it is calculated that the maximum required sixth gap D4 is 1.53 mm, and in practical applications, the sixth gap D4 may be designed to 1.65 mm. Specifically, in the above structure in which the first and second extension parts for fine positioning are cooperated with each other, the width of the third gap D1 and the width of the fifth gap D3 may be set to D1=D3=0.15 mm. In the structure in which the first and second extension parts for rough positioning are cooperated with each other. The size of each positioning gap may be determined according to the actual situation, and is not limited herein. In the backlight module, during the expansion process of the optical film of expanding toward two lateral sides from a fine positioning position, a sufficient expansion gap is also desired to be reserved between the optical film and the back plate, the mold frame or other structures according to the expansion condition. According to the data in the above table 2, the expansion space between and edge of the optical film and the back plate, the mold frame or other structures may be 1.0 mm. Therefore, a total of 2.0 mm expansion space at two sides of the optical film will satisfy the expansion requirement.

The present disclosure further provides a display module, including the backlight module according to any of the above solutions, and a display panel on an emission side of the backlight module.

Specifically, the display panel may be located on a side of the window part of the mold frame away from the bottom plate.

The present disclosure further provides a display apparatus, including the display module according to any of the above solutions.

Apparently, various changes and variations may be made to the embodiments of the present disclosure by those skilled in the art without departing from the spirit and scope of the present disclosure. Therefore, if such modifications and variations to the present disclosure are within the scope of the claims of the present disclosure and their equivalents, the present disclosure is also intended to encompass such modifications and variations.

What is claimed is:

1. A backlight module, comprising:
   a back plate comprising a bottom plate and a plurality of side plates around the bottom plate, wherein the plurality of side plates and the bottom plate enclose an assembly space;
   a light guide plate in the assembly space, wherein the light guide plate comprises a plurality of side faces each disposed opposite to one of the side plates, wherein a first gap is provided between each side face and the opposite side plate;
   at least two light bars, wherein each of the light bars is provided in different first gaps, wherein an emission side of each light bar is disposed opposite to the side face of the light guide plate, the first gap with a light bar is a first sub-gap, and the first gap without any light bar is a second sub-gap; and
   a plurality of elastic members, wherein at least part of the elastic members are located in respective first sub-gaps, and wherein the plurality of elastic members comprise first elastic members at two ends of each of the first sub-gap; and in the first sub-gap, the light bar is located between the two first elastic members.

2. The backlight module according to claim 1, wherein a length 1 of each elastic member in an extending direction of the first sub-gap where the elastic member is located satisfies:

$$\frac{F_n}{l \times h} = E\left(\frac{\Delta l}{l_0}\right),$$

where $F_n$ is a magnitude of a force applied to the elastic member during compression, E is a tensile strength of the elastic member, $\Delta l$ is a compression amount of the elastic member under the force, $l_0$ is a thickness of the elastic member in a width direction of the first sub-gap where the elastic member is located, and h is a thickness of a contact portion of the elastic member with the light guide plate in a thickness direction of the light guide plate.

3. The backlight module according to claim 1,
wherein a thickness of each elastic member in a naturally extending state in a width direction of the first gap where the elastic member is located is greater than a width of the first gap; and a sum of widths of two opposite first gaps is greater than an expansion amount of the light guide plate in an arrangement direction of the two opposite first gaps; and/or
wherein a distance from a surface of the elastic member away from the bottom plate to a first plane is less than or equal to a distance from a surface of the light guide plate away from the bottom plate to the first plane, wherein the first plane is a plane where a surface of the light guide plate facing the bottom plate is located; and/or
wherein each elastic member is made of a rubber material; and/or
wherein the backlight module further comprises an adhesive member in the central region of the second sub-gap, wherein the side face of the light guide plate is adhered to the side plate by the adhesive member; and/or
wherein in the second sub-gap, the adhesive member is in a compressed state under an action of the light guide plate and the side plate; and/or
wherein the adhesive member is a double-sided foam tape; and/or
wherein the plurality of side faces comprises two opposite first side faces and two opposite second side faces, the first sides adjoin the second side faces, and the first side faces each have a length greater than the second side faces; and wherein the at least two light bars comprise a first light bar and a second light bar respectively positioned in the first gaps between the two first side faces and the corresponding side plates, and a distance from the first light bar to the light guide plate is equal to a distance from the second light bar to the light guide plate.

4. The backlight module according to claim 1, wherein in the first sub-gap, a non-emission side of the light bar is fixedly connected to the side plate, and a second gap is provided between the emission side of the light bar and the side face of the light guide plate.

5. The backlight module according to claim 1, further comprising a heat dissipation plate in contact with the bottom plate, wherein the heat dissipation plate comprises a first heat dissipation part between a non-emission side of the light bar and the side plate;
wherein the non-emission side of the light bar is adhered to the first heat dissipation part, and the emission side of the light bar is abutted against the side face of the light guide plate;
wherein the plurality of elastic members comprise at least one second elastic member between the first heat dissipation part and the side plate;
wherein the heat dissipation plate further comprises a second heat dissipation part in contact with the bottom plate;
wherein an avoidance groove opposite to the second heat dissipation part is provided on a side of the bottom plate toward the light guide plate, and the second heat dissipation part is in slidable contact with a bottom of the avoidance groove; and
wherein a transparent protective structure abutted against the side face of the light guide plate is provided on the emission side of the light bar.

6. A display module, comprising the backlight module according to claim 1, and a display panel on an emission side of the backlight module.

7. A display apparatus, comprising the display module according to claim 6.

8. The backlight module according to claim 1, wherein the light bar comprises a substrate, a plurality of light sources, and a connector, wherein the substrate comprises a first portion and a second portion, wherein the first portion is located in the first sub-gap and extends along an extending direction of the first sub-gap, the second portion is located on a side of the first portion in a thickness direction of the light guide plate and extends out of the assembly space through an opening in the back plate, the plurality of light sources are located on a side of the first portion facing the light guide plate, and the connector is located on the second portion.

9. The backlight module according to claim 1, wherein the plurality of elastic members further comprise third elastic members at two ends of the second sub-gap.

10. The backlight module according to claim 9, wherein the plurality of elastic members comprise first elastic members at two ends of each of the first sub-gap; and in the first sub-gap, the light bar is located between the two first elastic members, and
wherein each third elastic member is connected to one of the first elastic members at a corner where the first sub-gap is intersected with the second sub-gap.

11. The backlight module according to claim 10, wherein for the third elastic member and the first elastic member intersected with each other, a length of the third elastic member in an extending direction of the first gap where the third elastic member is located is greater than a length of the first elastic member in an extending direction of the first gap where the first elastic member is located.

12. The backlight module according to claim 10, wherein different third elastic members form intersection structures of different shapes with the first elastic members.

13. The backlight module according to claim 1, wherein the plurality of elastic members further comprise a fourth elastic member in a central region of the second sub-gap.

14. The backlight module according to claim 1, further comprising a white reflective sheet between the light guide plate and the bottom plate, and an optical film on a side of the light guide plate away from the bottom plate.

15. The backlight module according to claim 14,
wherein a reinforcing rib is formed in a region of the bottom plate close to each of the side plates, the reinforcing rib projects toward a side of the bottom plate away from the light guide plate, and a reinforcing rib groove is formed on a side of the reinforcing rib facing the light guide plate; and wherein the backlight module further comprises a bottom pad in the reinforcing rib groove, the white reflective sheet is located between the bottom pad and the light guide plate, and the bottom pad is abutted against the white reflective sheet; and wherein the bottom pad is integrally formed with the elastic members.

16. The backlight module according to claim 15, wherein the optical film comprises a lower prism film, an upper prism film, and a reflective polarizing brightness-enhancing film, wherein the lower prism film is located on a side of the light guide plate away from the bottom plate, the upper prism film is located on a side of the lower prism film away from the bottom plate, and the reflective polarizing brightness-enhancing film is located on a side of the upper prism film away from the lower prism film; and wherein the prism structure on the light guide plate has a plurality of first prisms arranged side by side and extending in a first direction, the lower prism film has a plurality of second prisms arranged side by side and extending in a second direction, and the upper prism film has a plurality of third prisms arranged side by side and extending in the first direction, wherein the first direction is perpendicular to the second direction.

17. The backlight module according to claim 14, further comprising a mold frame, wherein the mold frame comprises a fixing part surrounding the light guide plate and a window part on a side of the optical film away from the bottom plate, wherein the fixing part is fixedly connected to the side plates, and the window part has a window corresponding to an effective emission region of the light guide plate, and wherein a plurality of extension parts are provided on edges of film layers in the optical film, wherein a plurality of positioning parts are provided on the side plates, the fixing part or the elastic members, wherein each positioning part is disposed opposite to one of the extension parts, and the optical film is positioned by the extension parts in cooperation with the corresponding positioning parts on the side plates, the fixing part or the elastic members.

18. The backlight module according to claim 17, wherein on a side of each elastic member away from the bottom plate, a stepped positioning part opposite to the extension part is provided, and the stepped positioning part has at least one stepped surface, wherein the extension parts of the film layers in the optical film are lapped on the stepped surface; and wherein the stepped positioning part has one stepped surface flush with a surface of the optical film facing the bottom plate, and the extension parts of the film layers in the optical film are lapped on the stepped surface, or, the stepped positioning part has a plurality of stepped surfaces each parallel and flush with a surface of each film layer in the optical film facing the bottom plate, and the extension parts of the film layers in the optical film are lapped on the respective stepped surfaces; and/or wherein a convex positioning part cooperated with the extension parts is provided on a side of each elastic member away from the bottom plate, the extension parts each have a first insertion hole cooperated with the convex positioning part, and the convex positioning part is cooperated with and inserted into the first insertion hole.

19. The backlight module according to claim 17, wherein each film layer in the optical film comprises a first edge and a second edge opposite to each other, the first edge is provided with at least one first extension part having a second insertion hole, and the second edge is provided with at least one second extension part in one-to-one correspondence with the at least one first extension part;

wherein a first positioning part cooperated with the first extension part is provided on a side of the side plates or the fixing part away from the bottom plate, the first positioning part comprises a first sink and a boss at a bottom of the first sink, the first extension part is located in the first sink, and the boss is inserted into the second insertion hole;

wherein a second positioning part cooperated with the second extension part is provided on a side of the side plates or the fixing part away from the bottom plate, the second positioning part comprises a second sink in which the second extension part is located;

wherein a third gap is provided between two side walls of the first extension part arranged in an extending direction of the first edge and a side wall of the first sink;

a fourth gap is provided between two side walls of the second insertion hole arranged along an arrangement direction the first edge and the second edge and a side wall of the boss;

a fifth gap is provided between two side walls of the second extension part arranged in an extending direction of the second edge and a side wall of the second sink, wherein the fifth gap has a width equal to the third gap;

a sixth gap is provided between the second edge and the side plate where the second sink is located; and wherein the first edge is provided with two first extension parts, the second edge is provided with two second extension parts, and each of the second extension parts is disposed opposite to one of the first extension parts, wherein the third gap, the fourth gap and the fifth gap formed by one set of opposite first extension part and second extension part with the side plate or the fixing part are smaller than the third gap, the fourth gap and the fifth gap formed by the other set of opposite first extension part and second extension part with the side plate or the fixing part, respectively.

20. The backlight module according to claim 14, wherein a surface of the light guide plate away from the bottom plate has a prism structure; and wherein in the prism structure of the surface of the light guide plate away from the bottom plate, an apex angle of the prism has an arc shape.

* * * * *